US007513070B2

(12) United States Patent
Ogura et al.

(10) Patent No.: US 7,513,070 B2
(45) Date of Patent: Apr. 7, 2009

(54) WORK SUPPORT AND MANAGEMENT SYSTEM FOR WORKING MACHINE

(75) Inventors: Hiroshi Ogura, Ryuugasaki (JP); Hideto Ishibashi, Ibaraki-ken (JP); Keiji Hatori, Tsuchiura (JP); Hiroshi Watanabe, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 296 days.

(21) Appl. No.: 10/533,184

(22) PCT Filed: Jun. 17, 2004

(86) PCT No.: PCT/JP2004/008858

§ 371 (c)(1), (2), (4) Date: Apr. 28, 2005

(87) PCT Pub. No.: WO2004/113624

PCT Pub. Date: Dec. 29, 2004

(65) Prior Publication Data

US 2006/0026101 A1 Feb. 2, 2006

(30) Foreign Application Priority Data

Jun. 19, 2003 (JP) ............................ 2003-174411

(51) Int. Cl.
*E02F 5/02* (2006.01)
*G05D 1/02* (2006.01)

(52) U.S. Cl. ............................ 37/348; 37/414; 701/50; 340/686.1; 172/2

(58) Field of Classification Search .................. 37/348, 37/382, 902, 414, 466; 701/50; 340/679, 340/686.1; 172/2, 4.5
See application file for complete search history.

(56) References Cited

U.S. PATENT DOCUMENTS

| | | | | | |
|---|---|---|---|---|---|
| 5,404,661 | A | * | 4/1995 | Sahm et al. | 37/348 |
| 5,438,771 | A | * | 8/1995 | Sahm et al. | 37/348 |
| 5,493,494 | A | * | 2/1996 | Henderson | 701/50 |
| 5,631,658 | A | * | 5/1997 | Gudat et al. | 342/457 |
| 5,735,352 | A | * | 4/1998 | Henderson et al. | 172/4.5 |
| 5,850,341 | A | * | 12/1998 | Fournier et al. | 701/50 |
| 5,854,988 | A | | 12/1998 | Davidson et al. | |

(Continued)

FOREIGN PATENT DOCUMENTS

CN 1395641 A 2/2003

(Continued)

*Primary Examiner*—Thomas A Beach
(74) *Attorney, Agent, or Firm*—Mattingly, Stanger, Malur & Brundidge, P.C.

(57) ABSTRACT

An excavation support database 40 includes a display table 47 and a display specifics table 48, which serve as storage means dedicated for display. The state of a working region per mesh is stored in the display table 47, and a discriminative display method (display color) is stored in the display specifics table 48 corresponding to the state per mesh. Reference is made to the display specifics table 48 on the basis of the state (height) per mesh, which is stored in the display table 47, to read the corresponding display color from the display specifics table 48, thereby displaying the state of the working region in a color-coded manner. Operation support and management realized with this system can easily be employed in different types of working machines in common and can inexpensively be performed with ease.

20 Claims, 16 Drawing Sheets

U.S. PATENT DOCUMENTS 5,887,365 A 3/1999 Fujishima et al.
5,919,242 A 7/1999 Greatline et al.
5,961,573 A * 10/1999 Hale et al. .................. 701/214
5,978,723 A 11/1999 Hale et al.
5,995,894 A * 11/1999 Wendte ....................... 701/50
6,047,227 A * 4/2000 Henderson et al. ............ 701/50
6,061,617 A 5/2000 Berger et al.
6,070,538 A 6/2000 Flamme et al.
6,070,673 A 6/2000 Wendte
6,073,068 A * 6/2000 Koehrsen ..................... 701/50
6,091,997 A 7/2000 Flamme et al.
6,112,144 A 8/2000 Allen
6,141,612 A 10/2000 Flamme et al.
6,195,604 B1 2/2001 Moore et al.
6,236,924 B1 5/2001 Motz et al.
6,266,595 B1 7/2001 Greatline et al.
6,285,930 B1 9/2001 Dickson et al.
6,336,067 B1 * 1/2002 Watanabe et al. ............. 701/50
6,360,167 B1 3/2002 Millington et al.
6,405,126 B1 6/2002 Palomo et al.
6,490,539 B1 12/2002 Dickson et al.
6,564,143 B1 5/2003 Alewine et al.
6,711,838 B2 * 3/2004 Staub et al. ................... 37/348
6,766,600 B2 7/2004 Ogura et al.
6,782,644 B2 * 8/2004 Fujishima et al. ............. 37/348
6,823,616 B1 * 11/2004 Gutter et al. .................. 37/461
6,832,175 B2 * 12/2004 Adachi et al. ............... 702/177
7,079,931 B2 * 7/2006 Sahm et al. ................... 701/50
2004/0020083 A1 * 2/2004 Staub et al. ................... 37/348
2007/0050116 A1 * 3/2007 Jernigan ...................... 701/50

FOREIGN PATENT DOCUMENTS

JP 5-287782 11/1993
JP 6-257189 9/1994
JP 7-271596 10/1995
JP 8-134958 5/1996
JP 8-506870 7/1996
JP 8-218444 8/1996
JP 10-103925 4/1998
JP 11-286971 10/1999
JP 11-324025 11/1999
JP 2001-74397 3/2001
JP 2001-98585 A 4/2001
JP 2001-303620 A 10/2001
JP 2001-356909 12/2001
JP 2002-83321 3/2002
JP 2002-256542 9/2002

* cited by examiner

WORK SUPPORT AND MANAGEMENT SYSTEM FOR WORKING MACHINE

TECHNICAL FIELD

The present invention relates to a work support and management system for a working machine, which measures and displays the three-dimensional position and state of each of working machines used for modifying topographic and geological features or improving ground and underground conditions, such as a hydraulic excavator, a mine sweeping machine and a ground improving machine, thereby supporting and managing work carried out by the working machine.

BACKGROUND ART

Aiming at an improvement of working efficiency, some of working machines, such as hydraulic excavators, are equipped with work supporting devices in a cab or an operating room for remote control. In particular, due to facilitation in three-dimensional position measurement using the GPS, it has recently been proposed to measure the three-dimensional position of a working machine and to display the measured position together with, e.g., a target position of work.

One example of such a support device is disclosed in JP,A 08-506870. In a self-propelled landform modifying machine, such as a truck-type tractor or a ground leveling machine, the disclosed support device is used to display a desired site landform (target landform) and an actual site landform (current site landform) in superimposed relation, to determine a target amount of work from the difference between the desired site landform and the actual site landform, and to control the machine. In addition, the disclosed support device graphically displays the difference between the desired site landform and the actual site landform in a plan view.

Also, JP,A 8-134958 discloses a remote-controlled work supporting image system in which data of landform under working and design data as a target value are displayed in superimposed relation on an operating display installed in an operating room.

Further, JP,A 2001-98585 discloses an excavation guidance system for a construction machine having an operating mechanism for excavation, which is operated to carry out the excavation for modifying a three-dimensional landform into a target three-dimensional landform. In the disclosed excavation guidance system, a position where a plane passing a current three-dimensional position of a bucket crosses the target three-dimensional landform and the bucket position are displayed on the same screen.

DISCLOSURE OF THE INVENTION

The known techniques mentioned above have problems as follows.

As working machines for modifying topographic and geological features or improving ground and underground conditions, there are many machines carrying out a variety of different kinds of work, such as an excavator (hydraulic shovel), a ground leveling machine, a ground improving machine, and a mine sweeping machine.

In JP,A 08-506870, the disclosed invention is mentioned as being applicable to a self-propelled landform modifying machine, such as a truck-type tractor or a ground leveling machine. Then, one example of applications to the truck-type tractor is explained as an embodiment.

However, when the desired site landform (target landform) and the actual site landform (current site landform) are displayed in superimposed relation, or when the difference between the desired site landform and the actual site landform is graphically displayed in a plan view, it is difficult to employ a system prepared for a particular type of working machine in another type of working machine because different types of working machines carry out different kinds of work. Accordingly, a new system must be prepared for each type of working machine, and a great deal of time is required to prepare the systems adapted for the various types of working machines.

Also, the systems disclosed in JP,A 8-134958 and JP,A 2001-98585 are explained in connection with examples of applications to a hydraulic excavator, and have similar problems to those mentioned above.

It is an object of the present invention is to provide a work support and management system for a working machine, which can easily be employed in different types of working machines in common, and which can inexpensively be prepared with ease.

(1) To achieve the above object, the present invention provides a work support and management system for a working machine, which supports and manages work carried out by the working machine, the system comprising first storage means for storing the state of a working region where the working machine carries out the work; second storage means for storing the relationship between the state of the working region and a discriminative display method; and display means for displaying the state of the working region, wherein the display means includes first processing means for obtaining discriminative display data by referring to the relationship stored in the second storage means on the basis of the state of the working region stored in the first storage means, and for displaying the state of the working region in a discriminative manner.

With that feature, even for different types of working machines, the state of the working region can similarly be displayed in a discriminative manner just by modifying parameters, which are used in the first processing means and are related to the state of the working region, in match with a modification of parameters related to the state of the working region, which are stored in the first and second storage means and used to represent the state of the working region. As a result, the work support and management system can easily be employed in different types of working machines in common, and it can inexpensively be prepared with ease.

(2) Also, to achieve the above object, the present invention provides a work support and management system for a working machine, which measures and displays the three-dimensional position and state of the working machine, thereby supporting and managing work carried out by the working machine, the system comprising first storage means for storing the state of the working region where the working machine carries out the work; second storage means for storing the relationship between the state of the working region and a discriminative display method; third storage means for storing the three-dimensional position and state of the working machine; and display means for displaying the state of the working region, wherein the display means includes first processing means for obtaining discriminative display data by referring to the relationship stored in the second storage means on the basis of the state of the working region stored in the first storage means, and for displaying the state of the working region in a discriminative manner, while displaying the three-dimensional position and state of the working machine in superimposed relation to the state of the working region based on the data stored in the third storage means.

With that feature, as with the above-mentioned feature, the work support and management system can easily be employed in different types of working machines in common, and it can inexpensively be prepared with ease. Also, since the position and state of the working machine are displayed in superimposed relation to the state of the working region in addition to the discriminative display of the state of the working region, it is possible to, for example, facilitate confirmation of the progress of work and avoid the work from being repeated in the same place, thus resulting in an increase of the working efficiency.

(3) Further, to achieve the above object, the present invention provides a work support and management system for a working machine, which supports and manages work carried out by the working machine, the system comprising first storage means used for display and storing the state of the working region where the working machine carries out the work; second storage means for storing the relationship between the state of the working region and a discriminative display method; third storage means used for arithmetic operation and storing the state of the working region; and display means for displaying the state of the working region, wherein the display means includes first processing means for obtaining discriminative display data by referring to the relationship stored in the second storage means on the basis of the state of the working region stored in the first storage means, and for displaying the state of the working region in a discriminative manner, and second processing means for obtaining work data based on data stored in the third storage means and displaying the obtained work data.

With that feature, as with the above-mentioned feature, the work support and management system can easily be employed in different types of working machines in common, and it can inexpensively be prepared with ease. Also, since the work data is displayed in addition to the discriminative display of the state of the working region, the working efficiency or the management efficiency can be increased by utilizing the work data. Moreover, since the processing is executed while selectively using the storage means between when the state of the working region is subjected to the discriminative display process and when the work data is subjected to the arithmetic operation process, the creation of programs can be facilitated, and the work support and management system can more easily be prepared.

(4) In above (1) to (3), preferably, the working region is represented in units of mesh indicating a plane of a predetermined size, the first storage means stores the state of the working region per mesh, and the first processing means obtains the discriminative display data by referring to the relationship stored in the second storage means on the basis of the state of the working region stored in the first storage means per mesh, and displays the state of the working region per mesh in a discriminative manner.

With that feature, since the first processing means is just required to execute the discriminative display process for the working region per mesh, the creation of programs for executing the discriminative display process for the working region can be facilitated, and the work support and management system can more easily be prepared.

(5) Still further, to achieve the above object, the present invention provides a work support and management system for a working machine, which measures and displays the three-dimensional position and state of the working machine, thereby supporting and managing work carried out by the working machine, the system comprising first storage means used for display and storing, as the state of the working region where the working machine carries out the work, at least one of the current state of the working region, the state of the working region before the start of the work, and a target value of the work; second storage means for storing the relationship between the state of the working region and a discriminative display method; third storage means for storing the three-dimensional position and state of the working machine; fourth storage means for storing the current state of the working machine; fifth storage means for storing at least one of the state of the working region before the start of the work and the target value of the work; sixth storage means for storing work data of the working machine; and display means for displaying the state of the working region, wherein the display means includes selection means for selectively displaying a plurality of screens corresponding to working processes, first processing means for, when any of the plurality of screens is selected, obtaining discriminative display data by referring to the relationship stored in the second storage means on the basis of the state of the working region stored in the first storage means, and displaying the state of the working region in a discriminative manner, and second processing means for, when any of the plurality of screens is selected, obtaining the work data of the working region based on data stored in related one or more of the first, third, fourth and fifth storage means, displaying the obtained work data, and storing the obtained work data in the sixth storage means.

With that feature, as with the above-mentioned feature, the work support and management system can easily be employed in different types of working machines in common, and it can inexpensively be prepared with ease. Also, any of the plurality of screens can selectively be displayed corresponding to the working process. Then, in each screen corresponding to the working process, the state of the working region is displayed in a discriminative manner, and the work data is further displayed. The working efficiency or the management efficiency can therefore be increased by utilizing the work data.

(6) In above (5), preferably, the working region is represented in units of mesh indicating a plane of a predetermined size, the first, fourth and fifth storage means store the state of the working region per mesh, the first processing means obtains the discriminative display data by referring to the relationship stored in the second storage means on the basis of the state of the working region stored in the first storage means per mesh, thereby displaying the state of the working region per mesh in a discriminative manner, and the second processing means obtains the work data per mesh based on the data stored in related one or more of the first, third, fourth and fifth storage means, thereby displaying the obtained work data.

With that feature, since the first and second processing means are just required to execute the respective processes per mesh, the creation of programs for executing those processes can be facilitated, and the work support and management system can more easily be prepared.

(7) In above (5), preferably, the plurality of screens selectively displayed by the selection means includes a work plan screen, and when the selection means selectively displays the work plan screen, the first processing means obtains the discriminative display data by referring to the relationship stored in the second storage means on the basis of, among the data stored in the first storage means, data regarding at least one of the state of the working region before the start of the work and the target value of the work, thereby displaying at least one the state before the start of the work and the target value of the work in a discriminative manner, and the second processing means computes and displays a target work amount based on the data stored in the fifth storage means, and stores the target work amount in the sixth storage means.

With that feature, the creation of a work plan can be facilitated, thus resulting in an increase of the working efficiency and the management efficiency.

(8) In above (5), preferably, the plurality of screens selectively displayed by the selection means includes a during-work screen, and when the selection means selectively displays the during-work screen, the first processing means obtains the discriminative display data by referring to the relationship stored in the second storage means on the basis of, among the data stored in the first storage means, data regarding the current state of the working region, thereby displaying the current state of the working region in a discriminative manner, while displaying the position and state of the working machine in superimposed relation to the state of the working region based on the data stored in the third storage means, and the second processing means computes and displays the data regarding the position and state of the working machine based on the data stored in the third storage means.

With that feature, it is possible to, for example, facilitate confirmation of the progress of work and avoid the work from being repeated in the same place, thus resulting in an increase of the working efficiency.

(9) In above (5), preferably, the plurality of screens selectively displayed by the selection means includes an after-work screen, and when the selection means selectively displays the after-work screen, the first processing means obtains the discriminative display data by referring to the relationship stored in the second storage means on the basis of the data stored in the first storage means, thereby displaying the state of the working region after the work in a discriminative manner, and the second processing means computes and displays an amount of the work made on that day based on, among the data stored in the fourth storage means, the data regarding the current state of the working region, and stores the amount of the work made on that day in the sixth storage means.

With that feature, logging on a daily report can be facilitated, and the management efficiency can be increased.

(10) In above (5), preferably, the plurality of screens selectively displayed by the selection means includes a total-work completion screen, and when the selection means selectively displays the after-work screen, the first processing means obtains the discriminative display data by referring to the relationship stored in the second storage means on the basis of, among the data stored in the first storage means, data regarding the current state of the working region, thereby displaying the state of the work region after the completion of total work, and the second processing means computes and displays a total amount of completed work based on the data stored in the fourth storage means and the data stored in the fifth storage means, and stores the quality management information in the sixth storage means.

With that feature, the total amount of completed work after the completion of total work can be confirmed, and the management efficiency can be increased.

(11) In above (1) to (6), preferably, the second storage means stores the discriminative display method in color-coded representation, and the first processing means displays the state of the working region in a color-coded manner.

(12) In above (1) to (11), preferably, the working machine is a hydraulic excavator, and the state of the working region is represented by landform of the working region.

(13) In above (1) to (11), the working machine may be a mine sweeping machine, and the state of the working region may be represented by the presence or absence of mines buried in the working region and the mine type.

(14) In above (1) to (11), the working machine may be a ground improving machine, and the state of the working region may be represented by positions where a solidifier is loaded and an amount of the loaded solidifier.

BEST MODE FOR CARRYING OUT THE INVENTION

Embodiments of the present invention will be described below with reference to the drawings.

Figure 1:
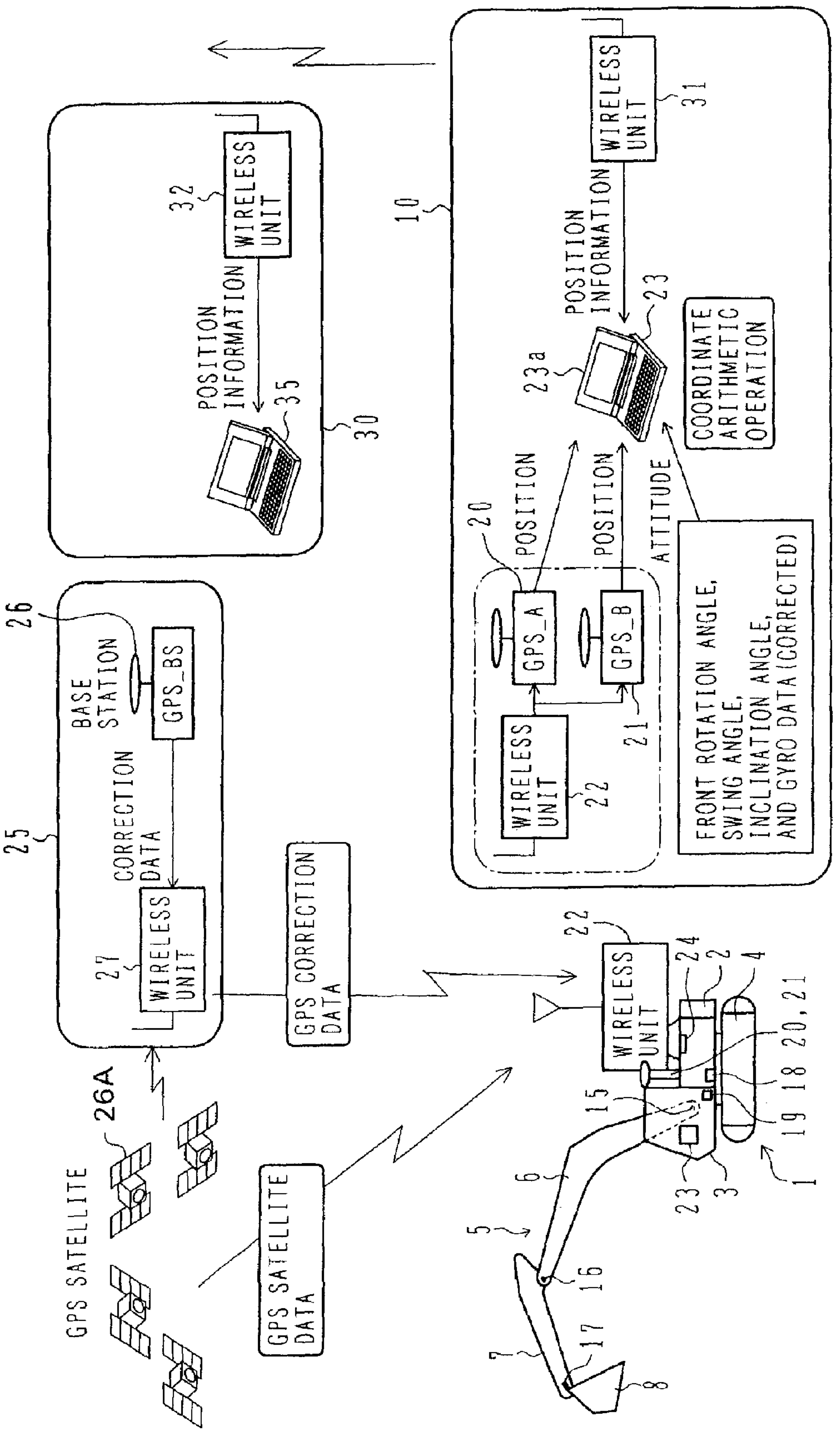
FIG. 1 is an illustration showing the overall configuration of a work support and management system according to a first embodiment in which the present invention is applied to a crawler mounted hydraulic excavator.

FIG. 1 is an illustration showing the overall configuration of a work support and management system according to a first embodiment in which the present invention is applied to a crawler mounted hydraulic excavator.

Referring to FIG. 1, a hydraulic excavator 1 comprises a swing body 2, a cab 3, a travel body 4, and a front operating mechanism 5. The swing body 2 is rotatably mounted on the travel body 4, and the cab 3 is located in a front left portion of the swing body 2. The travel body 4 is illustrated as being of the crawler type, but it may be of the wheel type having wheels for traveling.

The front operating mechanism 5 comprises a boom 6, an arm 7, and a bucket 8. The boom 6 is mounted to a front central portion of the swing body 2 rotatably in the vertical direction. The arm 7 is mounted to a fore end of the boom 6 rotatably in the back-and-forth direction, and the bucket 8 is mounted to a fore end of the arm 7 rotatably in the back-and-forth direction. The boom 6, the arm 7, and the bucket 8 are rotated respectively by a boom cylinder, an arm cylinder, and a bucket cylinder (which are not shown).

The hydraulic excavator 1 is equipped with an on-board system 10. The on-board system 10 comprises a boom angle sensor 15, an arm angle sensor 16, a bucket angle sensor 17, a swing angle sensor 18, an inclination sensor 24, a gyro 19, GPS receivers 20, 21, a wireless unit 22, and a computer 23 in order to compute the fore end position of the bucket 8.

Further, a GPS base station 25 is installed in a place of which latitude and longitude have exactly been measured. A signal from a GPS satellite 26A is received by the GPS receivers 20, 21 of the on-board system 10, and it is also received by a receiver 26 installed in the GPS base station 25. The GPS base station 25 computes correction data and transmits the computed correction data from a wireless unit 27 to the wireless unit 22 of the on-board system 10. The computer 23 of the on-board system 10 computes the bucket fore end position (three-dimensional position) based on the GPS satellite data, the correction data, and attitude data obtained from the sensors 15-18 and 24 and the gyro 19.

The computer 23 of the on-board system 10 includes an excavation support database (described later). This database is used to provide an operator with work support during excavation by displaying various data through steps of, for example, selecting necessary data from the database and displaying the current state of a working region and the position and state of the hydraulic excavator 1 in superimposed relation.

A management room 30 is installed in a place far away from the hydraulic excavator 1. Various data can also be viewed on a computer 33 in the management room 30 by transmitting the data stored as the database in the computer 23 and the position data computed by it from a wireless unit 31 of the on-board system 10 to a wireless unit 32 installed in the management room 30.

Figure 2:
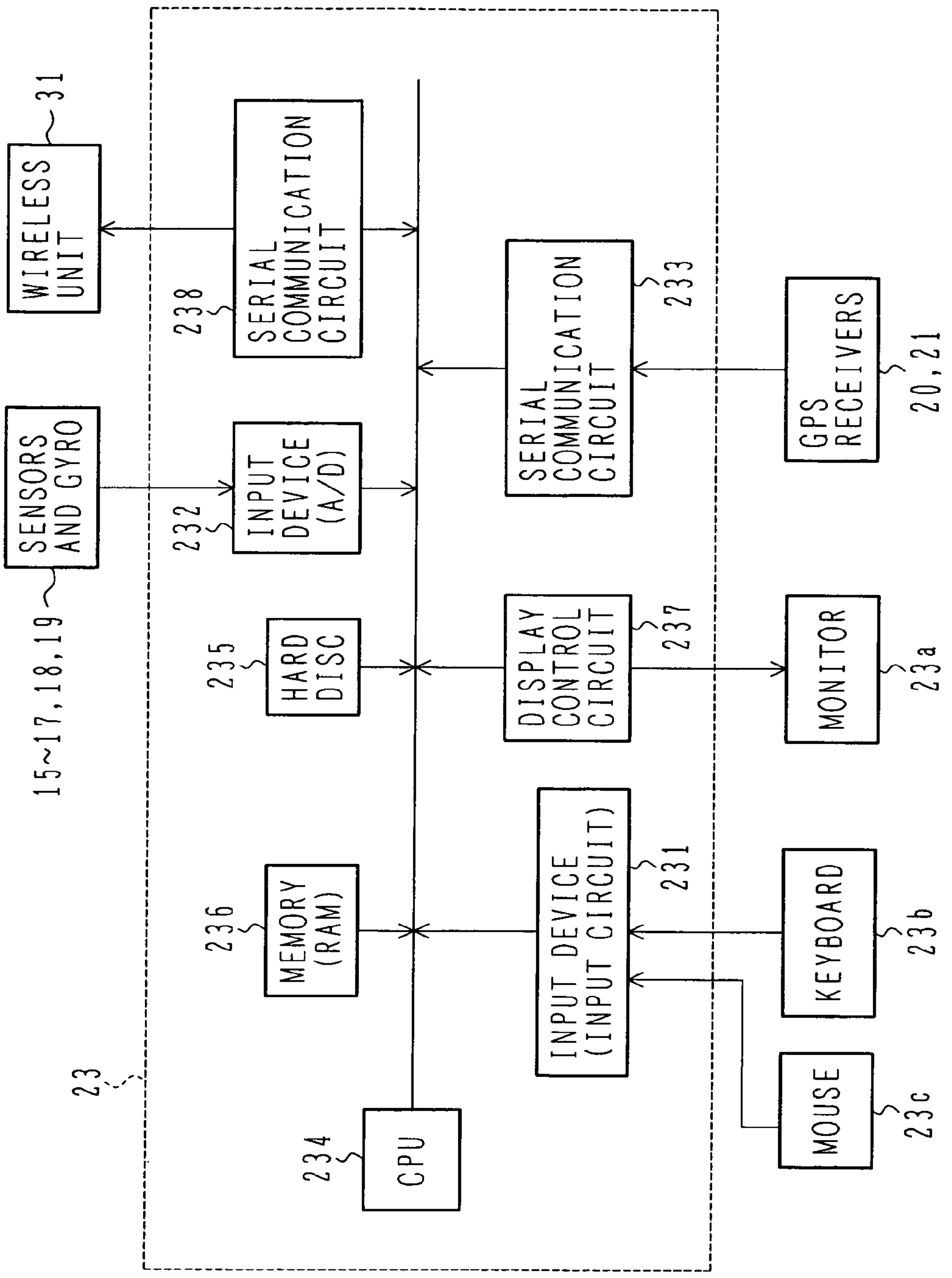
FIG. 2 is a block diagram showing the configuration of a computer 23 of an on-board system in the work support and management system.

FIG. 2 is a block diagram showing the configuration of the computer 23 of the on-board system 10.

The computer 23 comprises a monitor 23*a*, a keyboard 23*b*, a mouse 23*c*, an input device (input circuit) 231 for receiving operation signals from the keyboard 23*b* and the mouse 23*c*, an input device (A/D converter) 232 for receiving detected signals from the sensors 15-17, 18 and 24 and the gyro 19, a serial communication circuit 233 for receiving the position signals from the GPS receivers 20, 21, a central processing unit (CPU) 234, a main storage (hard disk) 235 for storing programs of control procedures and the excavation support database, a memory (RAM) 236 for temporarily storing numerical values during arithmetic operation, a display control circuit 237 for controlling display on the monitor 23*a*, and a serial communication circuit 248 for outputting position information to the wireless unit 31.

Figure 3:
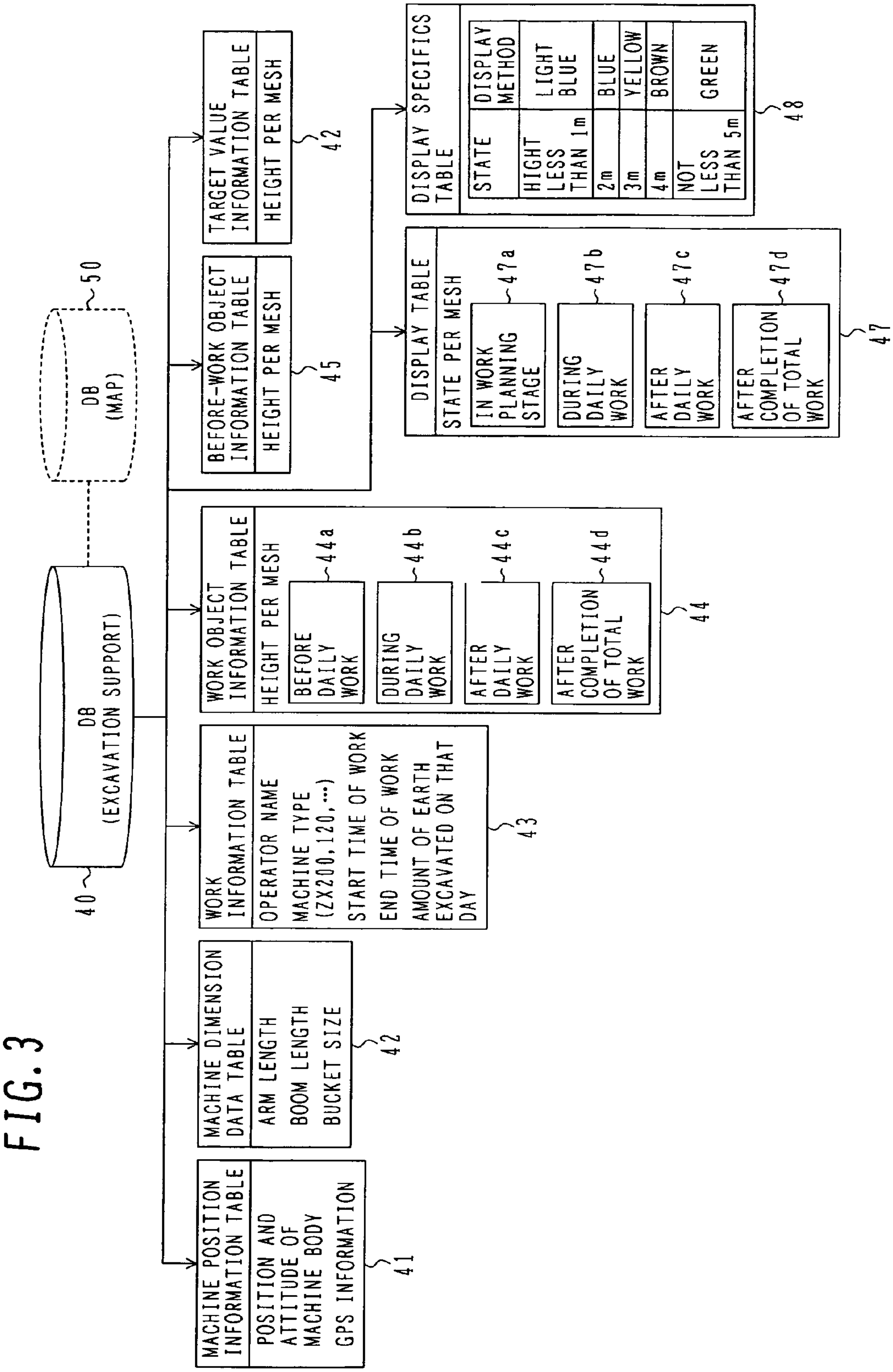
FIG. 3 is a representation showing the configuration of an excavation support database stored in the computer of the on-board system.

FIG. 3 is a representation showing the configuration of the excavation support database stored in the computer 23 of the on-board system 10.

The computer 23 of the on-board system 10 includes, as described above, the hard disk 235 serving as the main storage, and the hard disk 235 stores the excavation support database 40. The excavation support database 40 is made up of a machine position information table 41, a machine dimension data table 42, a work information table 43, a work object information table 44, a before-work object information table 45, a target value information table 46, a display table 47, and a display specifics table 48.

The machine position information table 41 stores the three-dimensional position of the hydraulic excavator 1, the front attitude (three-dimensional position of the bucket fore end), etc., which are measured as appropriate. The machine dimension data table 42 stores machine dimensions necessary for computing the front attitude, such as the arm length, the boom length, and the bucket size. The work information table 43 stores work data, such as the operator name, the machine type, the start time of work, the end time of work, the amount of earth excavated on that day (value calculated as described later). The work object information table 44 stores the current state of the working region. The before-work object information table 45 stores the state of the working region before the start of work (i.e., the original landform). The target value information table 46 stores the target landform of the working region.

The current state of the working region stored in the work object information table 44 includes the state before daily work (landform before work), the state during daily work (landform during work), the state after daily work (landform after work), and the state after the completion of total work. Those states are stored in areas 44*a*, 44*b*, 44*c* and 44*d*, which are independent of one another. Also, the current state of the working region, the state of the working region before the start of work (i.e., the original landform), and the target landform of the working region, which are stored respectively in the work object information table 44, the before-work object information table 45 and the target value information table 46, are each expressed in a way of representing the working region in units of mesh that indicates a plane of a predetermined size, and are each stored as height information per mesh.

The display table 47 and the display specifics table 48 are used to display the state of the working region on the monitor 23*a* of the computer 23. The display table 47 stores the state of the working region per mesh, and the display specifics table 48 stores the relationship between the state of the working region per mesh and the discriminative display method (display color).

The state of the working region stored in the display table 47 includes the state in the work planning stage, the state during work, the state after work, and the state after the completion of total work. The state in the work planning stage represents a value obtained by subtracting the height of the target landform stored in the target value information table 46 from the height in the state before the start of work (i.e., the height of the original landform) stored in the before-work object information table 45. The state during work represents a value obtained by subtracting the height of the target landform stored in the target value information table 46 from the height in the state during work, which is stored in the work object information table 44. The state after work represents a value obtained by subtracting the height of the target landform stored in the target value information table 46 from the height in the state after work, which is stored in the work object information table 44. The state after the completion of total work represents a value obtained by subtracting the height of the target landform stored in the target value information table 46 from the height in the state after the completion of total work, which is stored in the work object information table 44. Those states are stored in corresponding areas 47*a*, 47*b*, 47*c* and 47*d* within the display table 47 as information per mesh similarly to the tables 44 through 46.

Further, the relationship between the state of the working region and the discriminative display method (display color), which is stored in the display specifics table 48, is given such that the state of the working region is stored as the height information and the discriminative display method is provided by color coding. For example, the relationship is represented by combinations of height zones and colors, such as the height less than 1 m and light blue, the height not less than 1 m but less than 2 m and blue, the height not less than 2 m but less than 3 m and yellow, the height not less than 3 m but less than 4 m and brown, and the height not less than 5 m and green. The discriminative display method may also be practiced by using symbols, e.g., ⊙, ○, ●, x and Δ, instead of color coding.

Figure 4:
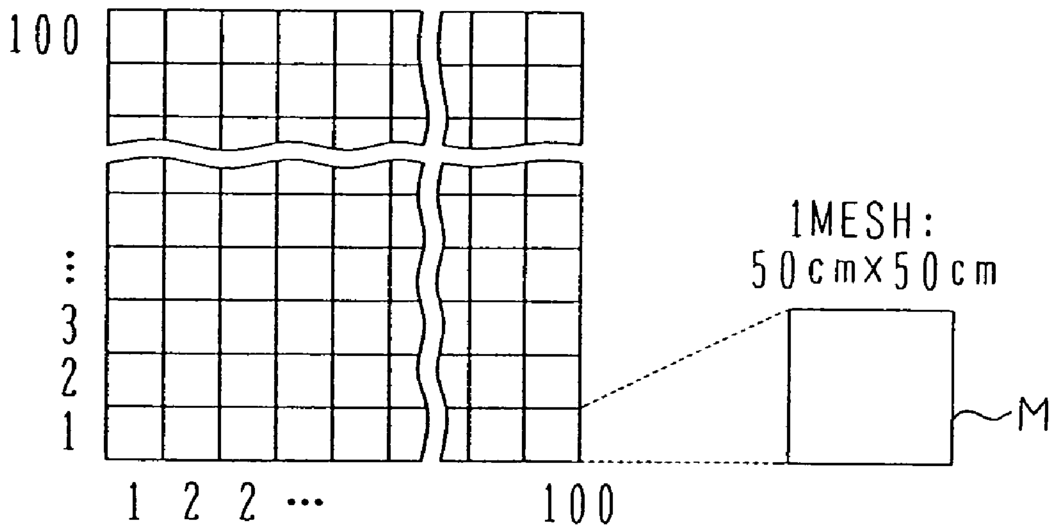
FIG. 4 is an illustration showing the concept of representing a working region in the form of meshes.

FIG. 4 is an illustration showing the concept of representing the working region in the form of meshes.

The lower left corner of the working region is defined as the origin of a mesh array, and a total of 10000 meshes M each having a square shape with one side of 50 cm are formed and displayed. The meshes M thus formed are managed using respective mesh numbers (Nos.) for identifying individual positions. The data format of the mesh number is given as two-dimensional array data, and a square block located at the left end in the lowest level is expressed by (1, 1) on an assumption that the vertical axis represents y and the horizontal axis represents x. Then, successive numbers are assigned to respective square blocks upward and rightward in increasing order for data management. In each of the work object information table 44, the before-work object information table 45, the target value information table 46, and the display table 47, the state of the working region is stored as height data in correspondence to the array data of the meshes M in one-to-one relation.

The state of the working region before the start of work (i.e., the original landform) can be obtained, for example, as the result of remote sensing using the satellite or the result of measurement using a surveying device. The thus-obtained data is subjected to the above-described mesh processing and then inputted to the computer 23 by using a recording medium, such as an IC card, to be stored in the before-work object information table 45 and the display table 47. The target landform of the working region can be obtained by storing CAD data of a working plan drawing and the current position of the bucket fore end in the computer 23, and by inputting data resulting from, e.g., direct teaching with the current position of the bucket fore end set as a target plane. The thus-obtained data is similarly subjected to the above-described mesh processing and then inputted to the computer 23 by using a recording medium, such as an IC card, to be stored in the target value information table 46 and the display table 47. The current state of the working region includes, as mentioned above, the state (landform) before daily work, the state (landform) during daily work, the state (landform) after daily work, and the state (landform) after the completion of total work. Of those states, the state during daily work can be obtained by storing, as the current height, the position of the bucket fore end under excavation and updating the previous current state. That data is periodically stored in the work object information table 44 and the display table 47 upon timer interrupts. Also, of the state before daily work, the state before work on the first day for the total working term can be obtained by copying the state before the start of work (i.e., the original landform) stored in the before-work object information table 45. The state before work on the second or subsequent day can be obtained by copying the state after work on the previous day, and the state after daily work can be obtained by copying the last state during work on that day. Those data are also stored in the work object information table 44 and the display table 47. Further, the state after the completion of total work can be obtained by copying the state after work at the completion of the total work, and that data is similarly stored in the work object information table 44 and the display table 47. Alternatively, the state after the completion of total work may be obtained as the result of remote sensing using the satellite, or the result of storing the position of the bucket bottom as the current height in the condition where the bucket bottom is brought into contact with the completed ground, or the result of measurement using a surveying device.

Furthermore, map data may be superimposed, as required, on the landform data stored in the above-described tables 44 through 47. This enables the operator to know the presence or absence of rivers, roads, etc., thus resulting in an increase of the working efficiency. In such a case, as indicated by dotted lines in FIG. 3, map database 50 may additionally be prepared so that map data stored in the map database 50 is used to provide the superimposed display.

Figure 5:
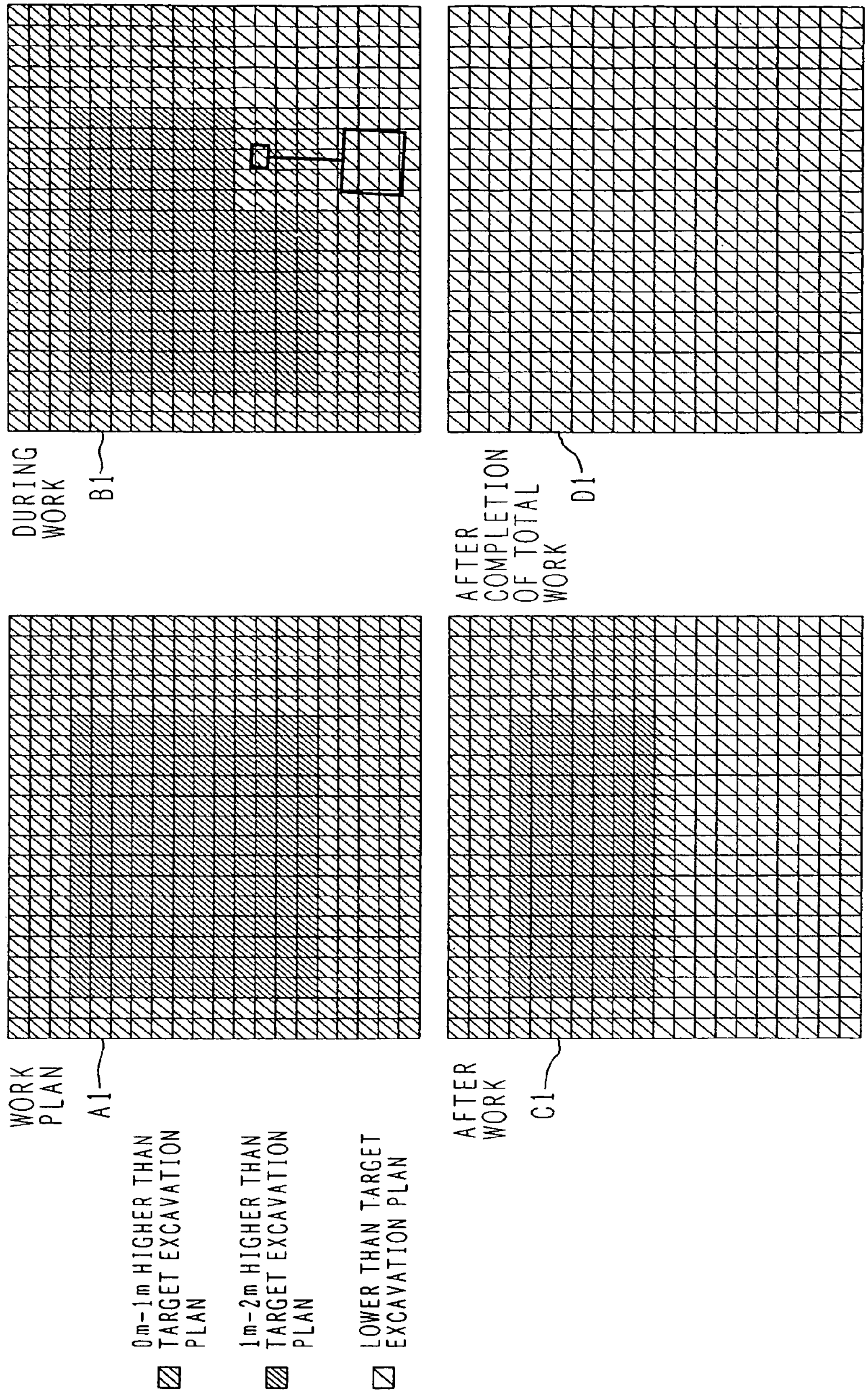
FIG. 5 shows screen examples displayed on a monitor of the computer.

FIG. 5 shows screen examples displayed on the monitor 23*a*. An upper left example in FIG. 5 represents a work plan screen A1 used in the work planning stage. In this work plan screen A1, the height of the landform obtained by subtracting the height of the target landform from the height in the state before the start of work (i.e., the height of the original landform) is displayed, as the state before the start of work (i.e., the height of the original landform) and the target landform, in a plan view where the height of the landform is represented in units of mesh by color coding per height zone (in FIG. 5, the height is represented by different densities of hatched meshes for the sake of convenience, and this is similarly applied to the following description). An upper right example in FIG. 5 represents a during-work screen B1 used for supporting the operator during work. In this during-work screen B1, the height of the landform obtained by subtracting the height of the target landform from the height in the state (of the landform) during work is displayed, as the state (landform) during work, in a plan view where the height of the landform is represented in units of mesh by color coding per height zone. Further, the three-dimensional position of the hydraulic excavator and the front attitude (three-dimensional position of the bucket fore end) are displayed in superimposed relation to the state during work. A lower left example in FIG. 5 represents an after-work screen C1 used after the end of work on one day. In this after-work screen C1, the height of the landform obtained by subtracting the height of the target landform from the height in the state (of the landform) after work on that day is displayed, as the state (landform) after work, in a plan view where the height of the landform is represented in units of mesh by color coding per height zone. A lower right example in FIG. 5 represents a total-work completion screen D1 used after the completion of total work for the planned entire working region. In this total-work completion screen D1, the height of the landform obtained by subtracting the height of the target landform from the height in the state (of the landform) after the completion of total work is displayed, as the state (height) after the completion of total work, in a plan view where the height of the landform is represented in units of mesh by color coding per height zone.

Figure 6:
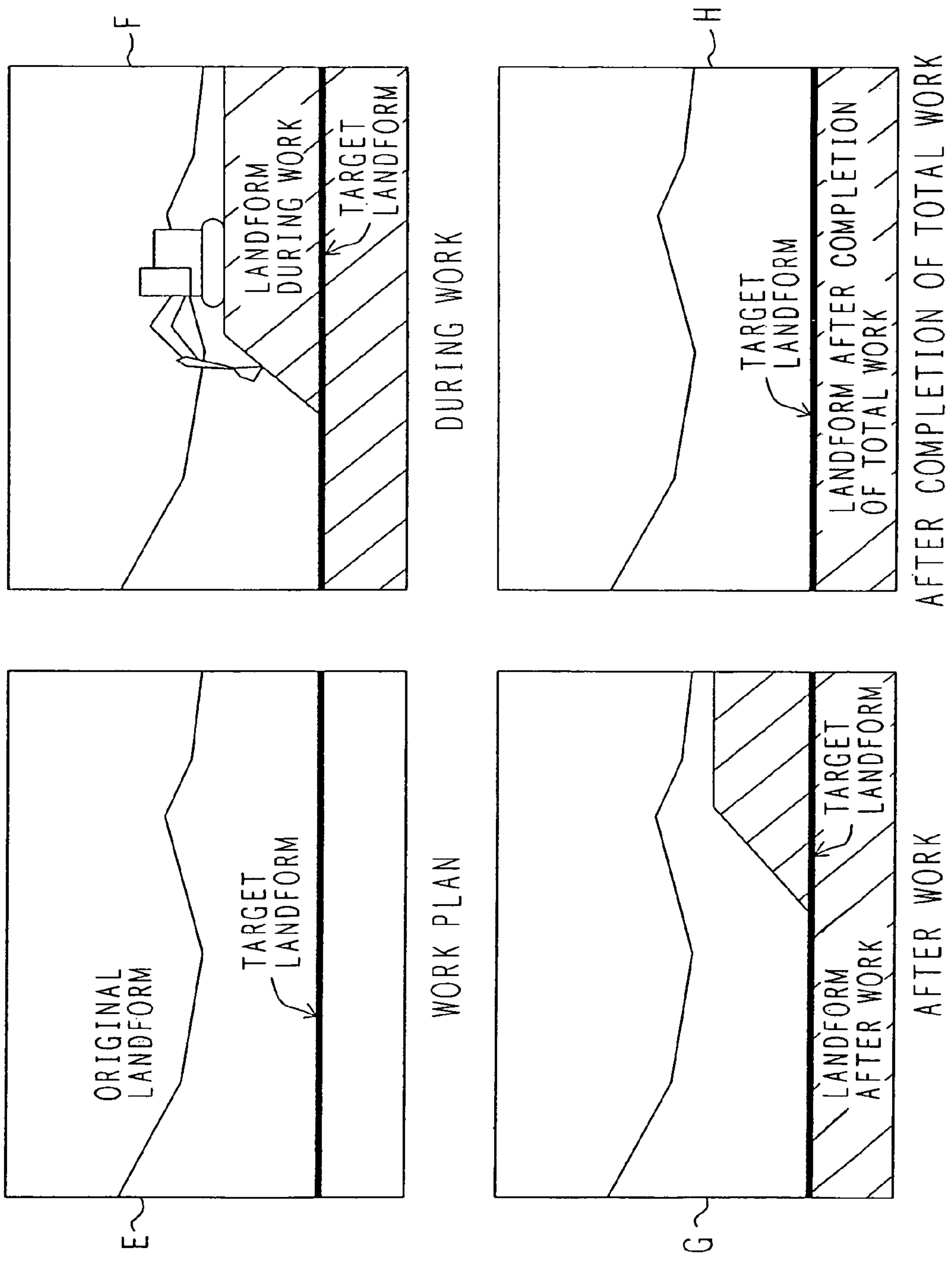
FIG. 6 shows other screen examples displayed on the monitor of the computer.

FIG. 6 shows other screen examples displayed on the monitor 23*c*. An upper left example in FIG. 6 represents a work plan screen E, an upper right example in FIG. 6 represents a during-work screen F, a lower left example in FIG. 6 represents an after-work screen G, and a lower right example in FIG. 6 represents a total-work completion screen H. The work plan screen E displays the state before the start of work (i.e., the original landform) and the target landform in a vertical sectional view. The during-work screen F displays the state before the start of work (i.e., the original landform), the target landform, and the state (landform) during work in a vertical sectional view. The during-work screen F also displays the three-dimensional position of the hydraulic excavator and the front attitude (three-dimensional position of the bucket fore end) in superimposed relation to the state during work. The after-work screen G displays the state before the start of work (i.e., the original landform), the target landform, and the state (landform) after work on that day in a vertical sectional view. The total-work completion screen H displays the state before the start of work (i.e., the original landform) and the state (landform) after the completion of the total work in a vertical sectional view.

Figure 7:
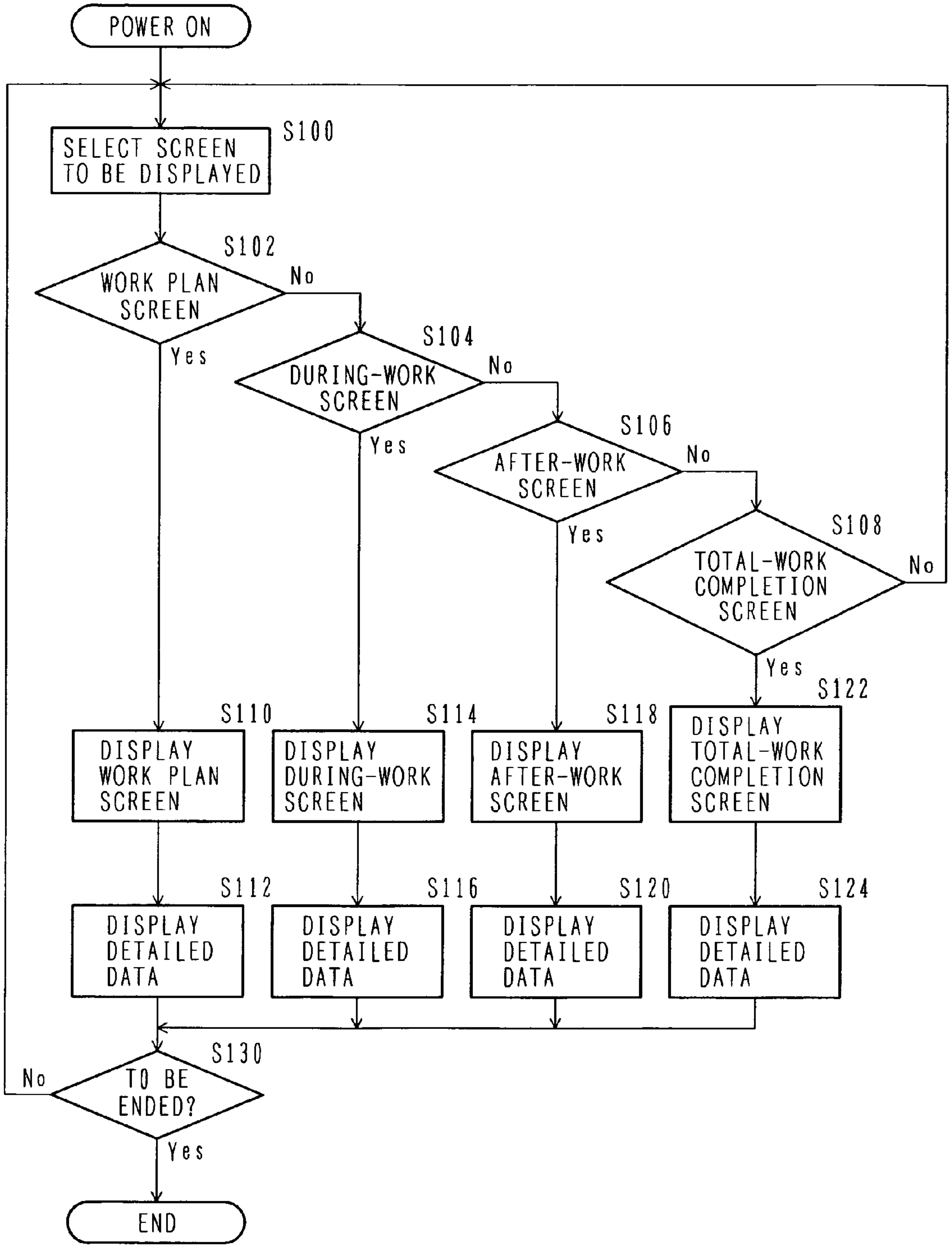
FIG. 7 is a flowchart showing processing procedures of the computer.

FIG. 7 is a flowchart showing processing procedures of the computer 23.

As described above, the computer 23 of the on-board system 10 includes the central processing unit (CPU) 234 and the main storage (hard disk) 235, and the main storage 235 stores the control programs. The CPU 234 executes a display process, shown in FIG. 7, in accordance with the control programs.

First, the operator gets on the hydraulic excavator 1 and starts up an engine. Then, the operator turns on a power supply of the on-board system 10 to boot up the on-board system 10. At this time, a start screen is displayed on the monitor 23*a*. The start screen includes display of a menu for selecting the screen to be displayed, and the menu contains items "work plan screen", "during-work screen", "after-work screen", and "total-work completion screen".

Then, the operator manipulates the keyboard 23*b* or the mouse 23*c* to select one of the items "work plan screen", "during-work screen", "after-work screen", and "total-work completion screen" on the menu (step S100). If "work plan screen" is selected, the work plan screen A1 shown in FIG. 5 is displayed on the monitor 23*a* and detailed data in the work planning stage is also displayed (steps S102, S110 and S112). The detailed data displayed here includes the area of the entire planned working region, the target work amount (total target amount of earth to be excavated) for the entire planned working region, etc. The target work amount (total target amount of earth to be excavated) for the entire planned working region is calculated from the difference between the state of the working region before the start of work (i.e., the original landform) and the target landform of the working region, and is displayed as a numerical value. Further, the calculated data is stored in the work information table 43.

If "during-work screen" is selected, the during-work screen B1 shown in FIG. 5 is displayed on the monitor 23*a* and detailed data during work is also displayed (steps S104, S114 and S116). The detailed data displayed here includes the area of the working region currently under work, the angle and prong end height of the bucket of the hydraulic excavator, etc. The angle and prong end height of the bucket of the hydraulic excavator are calculated from sensor values at appropriate timings and are displayed as numerical values. Further, those calculated data are stored in the machine position information table 41.

If "after-work screen" is selected, the after-work screen C1 shown in FIG. 5 is displayed on the monitor 23*a* and detailed data after work is also displayed (steps S106, S118 and S120). The detailed data displayed here includes the area of the finished working region and the amount of finished work (amount of excavated earth) on that day. The amount of finished work (amount of excavated earth) on that day is calculated from the difference between the state (landform) before work and the state (landform) after work on that day, and is displayed as a numerical value. Further, the calculated data is stored in the work information table 43.

If "total-work completion screen" is selected, the total-work completion screen D1 shown in FIG. 5 is displayed on the monitor 23*a* and detailed data after the completion of total work is also displayed (steps S108, S122 and S124). The detailed data displayed here includes the total area and excavation accuracy of the completed working region, the total amount of excavated earth, etc. The excavation accuracy is calculated as the difference between the target landform of the working region and the state (landform) after the completion of total work, and is displayed as a numerical value. Further, after the completion of total work, the total amount of excavated earth is calculated by summing up the daily work amount from the first to last day, and the calculated result is displayed as a numerical value. Those data are also stored in the work information table 43.

Each of the above-described screens has a screen switching button displayed on it so that the screens E through H shown in FIG. 6 can selectively be switched over by depressing the button with input operation from the keyboard 23*b* or the mouse 23*c*. The foregoing process is repeatedly executed until an end button displayed on each screen is depressed (step S130).

Figure 8:
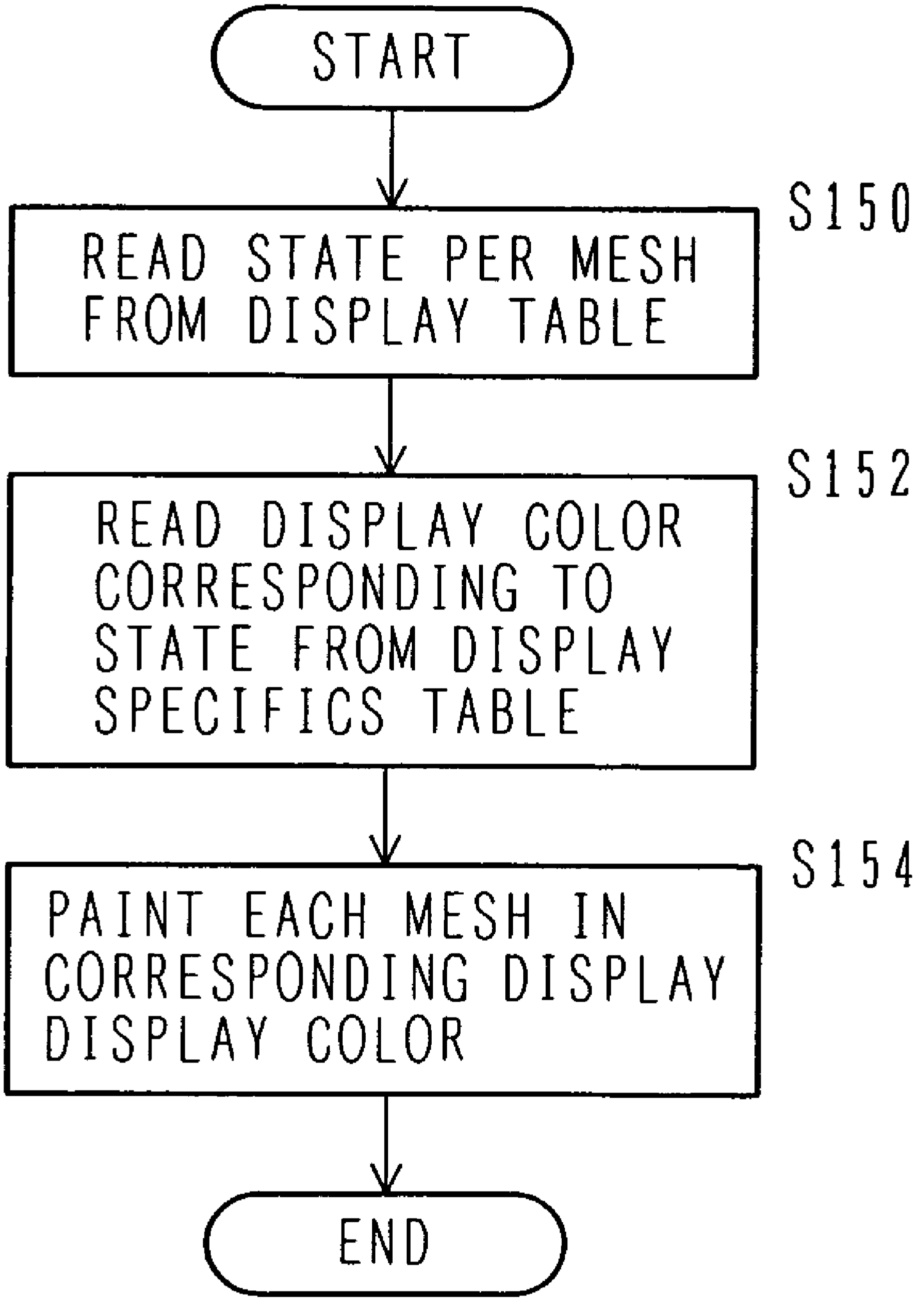
FIG. 8 is a flowchart showing processing procedures of steps of displaying respective screens in the flowchart of FIG. 7 when any of a work plan screen, a during-work screen, an after-work screen, and a total-work completion screen is optionally selected.

FIG. 8 is a flowchart showing processing procedures of steps S110, S114, S118 and S122 of displaying the respective screens when any of the work plan screen, the during-work screen, the after-work screen, and the total-work completion screen is optionally selected.

When any of the work plan screen, the during-work screen, the after-work screen, and the total-work completion screen is selected, the computer accesses the display table 47 and the display specifics table 48 of the excavation support database 40. It first reads the state (height) per mesh from the corresponding area in the display table 47 (step S150), then reads the display color corresponding to the state (height) from the display specifics table 48 (step S152), and then paints each mesh in the corresponding display color (step S154).

Additionally, the processing of step S114 of displaying the during-work screen includes the function of displaying the three-dimensional position of the hydraulic excavator and the front attitude (three-dimensional position of the bucket fore end) in superimposed relation to the state during work.

This embodiment thus constituted can provide advantages as follows.

The excavation support database 40 includes the display table 47 and the display specifics table 48, which serve as storage means dedicated for display. The state of the working region per mesh is stored in the display table 47, and the discriminative display method (display color) is stored in the display specifics table 48 corresponding to the state per mesh. Reference is made to the display specifics table 48 on the basis of the state (height) per mesh, which is stored in the display table 47, to read the corresponding display color from the display specifics table 48, thereby displaying the state of the working region in a color-coded manner. Even for different types of working machines, therefore, the state of the working region can similarly be displayed in a discriminative manner just by modifying parameters, which are used to represent the state of the working region stored in the display table 47 and the display specifics table 48, depending on the type of working machine and by modifying, in match with such a modification, parameters related to the state of the working region, which are used in the processing software represented as the flowcharts of FIGS. 7 and 8. As a result, it is possible to easily employ the work support and management system in different types of working machines in common, and to inexpensively prepare the work support and management system with ease.

Also, the display table 47 dedicated for display is provided separately from the work object information table 44, the before-work object information table 45 and the target value information table 46, and the processing is executed while selectively using the storage means, i.e., either the display table 47 or the others including the work object information table 44, the before-work object information table 45 and the target value information table 46, between when the state of the working region is subjected to the discriminative display process and when the work data is subjected to the arithmetic operation process. Therefore, the creation of the programs can be facilitated, and the work support and management system can more easily be prepared.

Further, the working region is represented in units of mesh indicating a plane of a predetermined size, and the state of the working region is stored per mesh in the work object information table 44, the before-work object information table 45, the target value information table 46, and the display table 47. The processing software shown in the flowcharts of FIGS. 7 and 8 executes the display process and the arithmetic operation process of the detailed data per mesh. Therefore, the creation of the individual programs can be facilitated, and the work support and management system can more easily be prepared.

Moreover, with this embodiment, when the work plan screen is selected, the state of the working region before the start of work (i.e., the original landform) is displayed in a color-coded manner based on the difference between the original landform and the target landform of the working region, and the area of the entire planned working region and the target work amount (total target amount of earth to be excavated) are displayed as numerical values. Therefore, the work plan can easily be prepared, thus resulting in an increase of the working efficiency and the management efficiency.

When the during-work screen is selected, the state during work is displayed in a color-coded manner based on the difference between the landform during work and the target landform, and the three-dimensional position of the hydraulic excavator and the front attitude (three-dimensional position of the bucket fore end) are displayed in superimposed relation to the state during work. It is therefore possible to facilitate confirmation of the progress of work, to avoid the excavation from being repeated in the same place, and to increase the working efficiency. In addition, finishing stakes are no longer required in actual work, and the number of workers required in the site can be reduced, thus resulting in an increase of the working efficiency and a reduction of the cost.

When the after-work screen is selected, the state (landform) after work on that day is displayed in a color-coded manner based on the difference between the landform after work on that day and the target landform, and the area of the finished working region and the amount of finished work (amount of excavated earth) on that day are displayed as numerical values. Therefore, logging on a daily report can be facilitated, and the management efficiency can be increased.

When the total-work completion screen is selected, the state (landform) after the completion of total work is displayed based on the difference between the landform after the completion of total work and the target landform of the working region, and that difference is displayed as a numerical value. Therefore, quality management information can be obtained. By utilizing the quality management information for the next work plan, a due consideration can be taken in when re-working is performed or the work plan is reviewed again, which results in an increase of the working efficiency. Further, knowing the total amount of excavated earth contributes to increasing the management efficiency.

In addition, since the various above-mentioned data and the position data of the hydraulic excavator are transmitted from the wireless unit 31 to the wireless unit 32 in the management room 30, it is possible to view the same data in the management room far away from the hydraulic excavator, and to confirm the state of the ongoing work.

A second embodiment of the present invention will be described with reference to FIG. 9 through 12.

Figure 9:
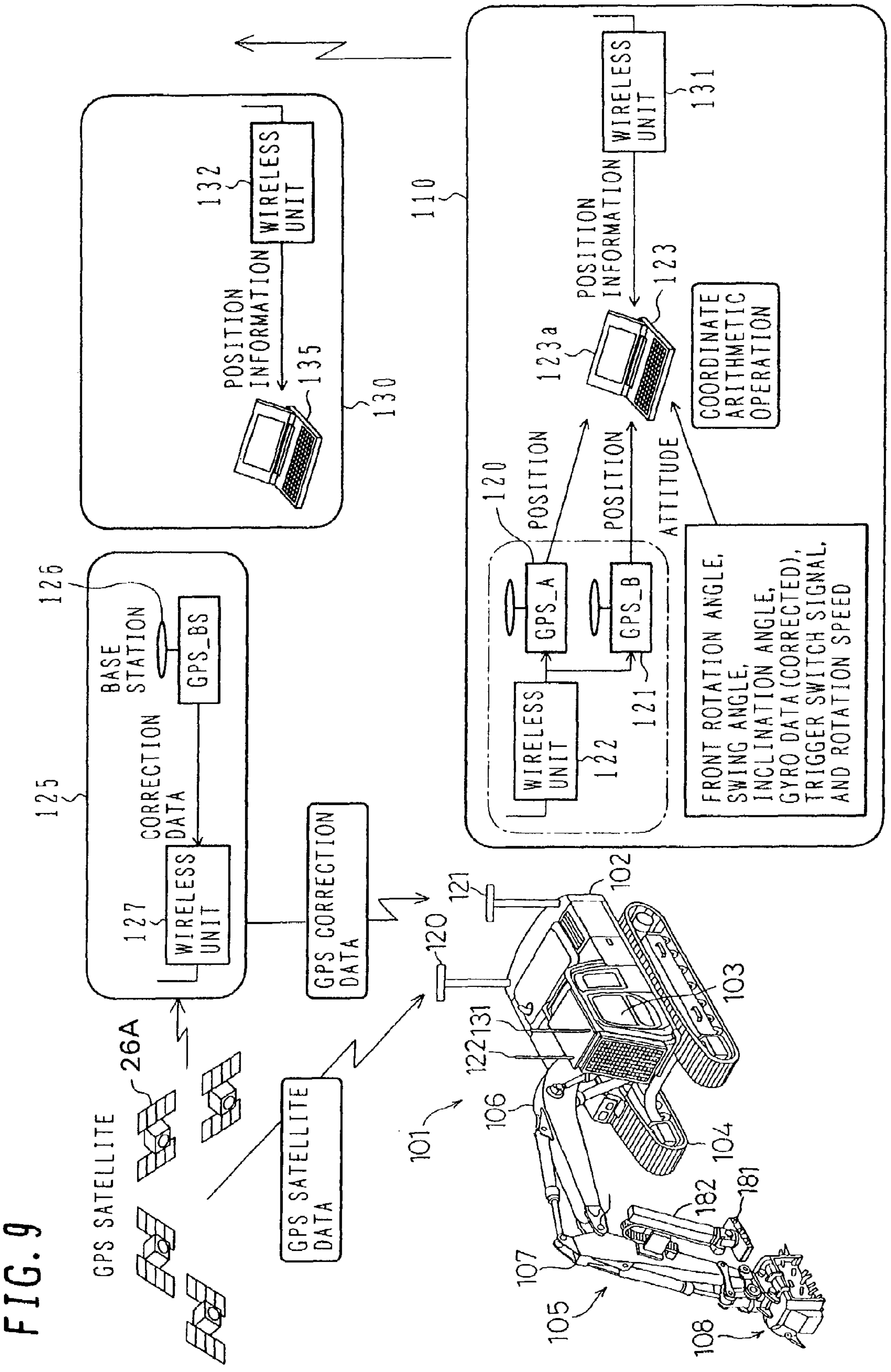
FIG. 9 is an illustration showing the overall configuration of a work support and management system according to a second embodiment in which the present invention is applied to a mine sweeping machine.

FIG. 9 is an illustration showing the overall configuration of a work support and management system according to the second embodiment when the present invention is applied to a mine sweeping machine.

Referring to FIG. 9, a mine sweeping machine 101 is constructed by using a crawler mounted hydraulic excavator as a base machine, and has the same basic structure as the hydraulic excavator shown in FIG. 1. Similar components to those in FIG. 1 are denoted by respective numerals increased by 100. However, a front operating mechanism 105 includes a rotary cutter 108 instead of the bucket, and a radar explosive probing sensor 181 is mounted to a lateral surface of an arm 107. The sensor 181 is movable along the lateral surface of an arm 107 through a telescopic extendable arm 182. Also, the sensor 181 is rotatable relative to the telescopic extendable arm 182 by a probing sensor cylinder.

An on-board system 110 is mounted on the mine sweeping machine 101, and a GPS base station 125 and a management room 130 are installed in other places. The GPS base station 125 and the management room 130 also have the same basic configuration as those shown in FIG. 1, and similar components to those in FIG. 1 are denoted by respective numerals increased by 100. However, the on-board system 110 includes additional switches, such as an operation switch for turning on/off the operation of the rotary cutter 108, an operation switch for turning on/off the operation of the explosive probing sensor 181, a trigger switch for inputting an event that an anti-personal mine has been detected as a result of the probing, a trigger switch for inputting an event that an antitank mine has been detected as a result of the probing, a trigger switch for inputting an event that an unexploded shell has been detected as a result of the probing, a trigger switch for inputting an event that an anti-personal mine has been disposed of, and a trigger switch for inputting an event that an antitank mine or an unexploded shell has been removed.

The construction and operation of the mine sweeping machine 101 are described in detail in Japanese Patent No. 3016018 and Japanese Patent Application No. 2003-03162.

Further, a computer 123 of the on-board system 110 has the same configuration as that in the first embodiment shown in FIG. 2. In this second embodiment, however, signals from the above-mentioned trigger switches are also inputted to the input device (A/D converter) 232 (see FIG. 2).

Figure 10:
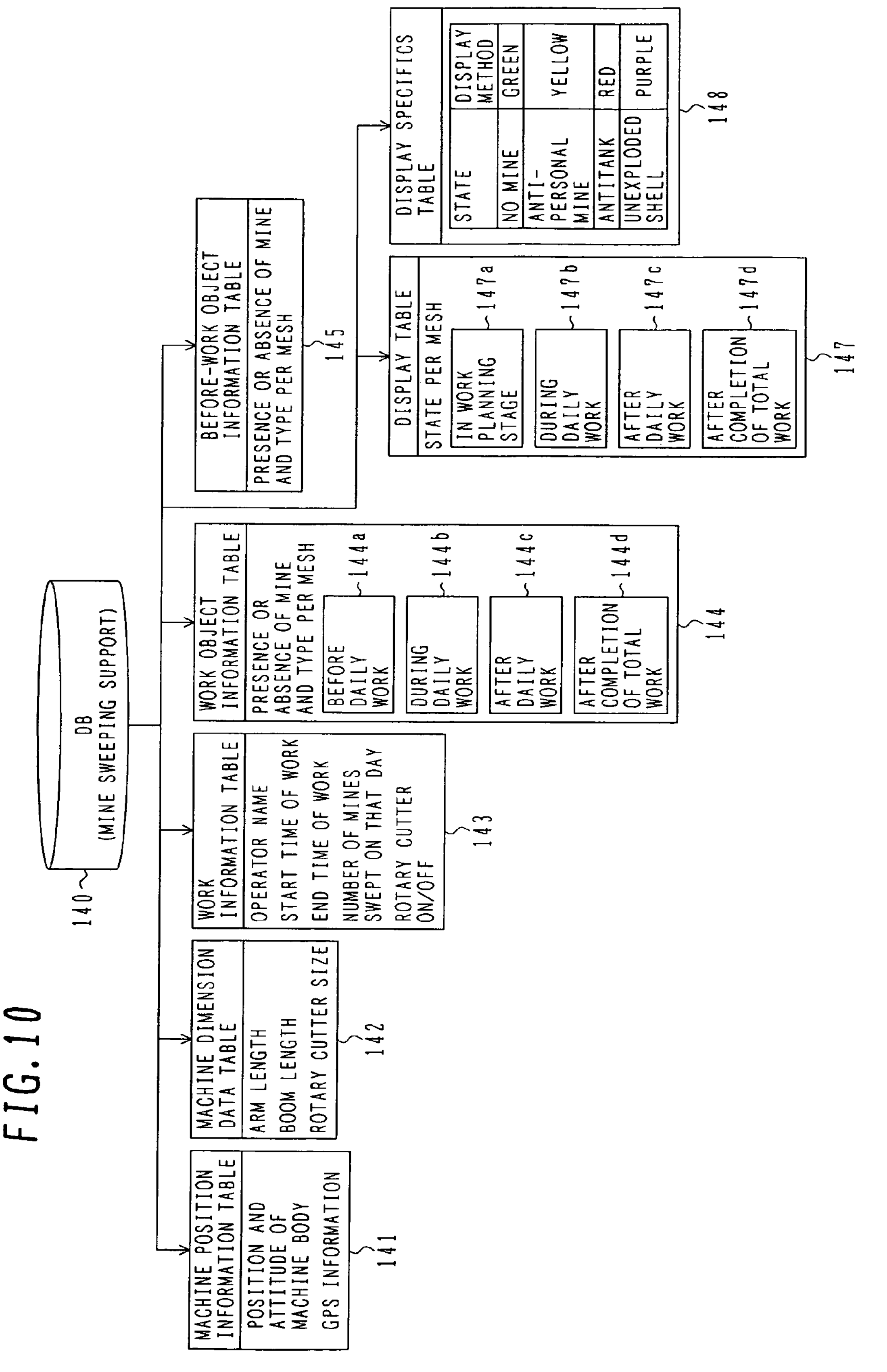
FIG. 10 is a representation showing the configuration of an excavation support database stored in a computer of an on-board system.

As shown in FIG. 10, the computer 123 of the on-board system 100 includes a mine sweeping support database 140.

The mine sweeping support database 140 also has the same basic configuration as the database in the first embodiment shown in FIG. 3 except for omission of the target value table, and similar tables to those in FIG. 3 are denoted by respective numerals increased by 100. More specifically, the mine sweeping support database 140 is made up of a machine position information table 141, a machine dimension data table 142, a work information table 143, a work object information table 144, a before-work object information table 145, a display table 147, and a display specifics table 148.

The data contents stored in the tables 141 through 148 are essentially the same as those in the first embodiment shown in FIG. 3 except for the following points.

The machine position information table 141 and the machine dimension data table 142 store, as attachment information, information related to the rotary cutter or the explosive probing sensor instead of the bucket. The work information table 143 stores, instead of the amount of excavated earth, the number of mines disposed of, on/off information of the rotary cutter and the explosive probing sensor, etc. The work object information table 144, the before-work object information table 145, and the display table 147 store, instead of the landform (height), buried mine data (presence or absence of a mine and mine type) as the state of the working region.

The following points are the same as in the first embodiment shown in FIG. 3. The current state of the working region stored in the work object information table 144 includes the state before daily work, the state during daily work, the state after daily work, and the state after the completion of total work. Those states are stored in areas 144*a*, 144*b*, 144*c* and 144*d*, which are independent of one another. The current state of the working region and the state of the working region before the start of work, which are stored respectively in the work object information table 144 and the before-work object information table 145, are each expressed in a way of representing the working region in units of mesh that indicates a plane of a predetermined size, and are each stored as information per mesh. The display specifics table 148 stores the relationship between the state of the working region per mesh and the discriminative display method (display color).

The state of the working region stored in the display table 147 includes the state in the work planning stage, the state during work, the state after work, and the state after the completion of total work. The state in the work planning stage is given by copying the state before the start of work, which is stored in the before-work object information table 145. The state during work is given by copying the state during work, which is stored in the work object information table 144. The state after work is given by copying the state after work, which is stored in the work object information table 144. The state after the completion of total work is given by copying the state after the completion of total work, which is stored in the work object information table 144. Those states are stored in corresponding areas 147*a*, 147*b*, 147*c* and 147*d* within the display table 147.

Further, the relationship between the state of the working region and the discriminative display method (display color), which is stored in the display specifics table 148, is given such that the state of the working region is stored as information indicating the presence or absence of a mine and the mine type and the discriminative display method is provided by color coding. For example, the relationship is represented by combinations of states and colors, such as no mine and green, an anti-person mine and yellow, an antitank mine and red, and an unexploded shell and purple. The discriminative display method may also be practiced, as mentioned above, by using symbols, e.g., ⊙, ○, ●, x and Δ, instead of color coding.

The state of the working region before the start of work (i.e., the buried mine data—the presence or absence of a mine and the mine type) can be obtained, for example, as the result of remote sensing using the satellite, or the result of making measurement with the probing sensor 181 of the mine sweeping machine 101 and inputting the measured data. The thus-obtained data is subjected to the above-described mesh processing and then inputted to the computer 123 by using a recording medium, such as an IC card, to be stored in the before-work object information table 145. The current state of the working region includes, as mentioned above, the state before daily work, the state during daily work, the state after daily work, and the state after the completion of total work. Of those states, the state during daily work can be obtained by, whenever a mine is disposed of, inputting the disposal of the mine from the trigger switch and updating the previous current state. That data is periodically stored and updated in the work object information table 144 upon timer interrupts. Also, of the state before daily work, the state before work on the first day for the total working term can be obtained by copying the state before the start of work stored in the before-work object information table 145. The state before work on the second or subsequent day can be obtained by copying the state after work on the previous day, and the state after daily work can be obtained by copying the last state during work on that day. Those data are also stored in the work object information table 144. Further, the state after the completion of total work can be obtained by copying the state after work at the completion of the total work, and that data is similarly stored in the work object information table 144. Alternatively, the state after the completion of total work may be obtained as the result of probing again the presence or absence of mines.

As mentioned above, map data may be superimposed, as required, on the buried mine data stored in the tables 144 through 147. This enables the operator to know the presence or absence of rivers, roads, etc., thus resulting in an increase of the working efficiency.

Figure 11:
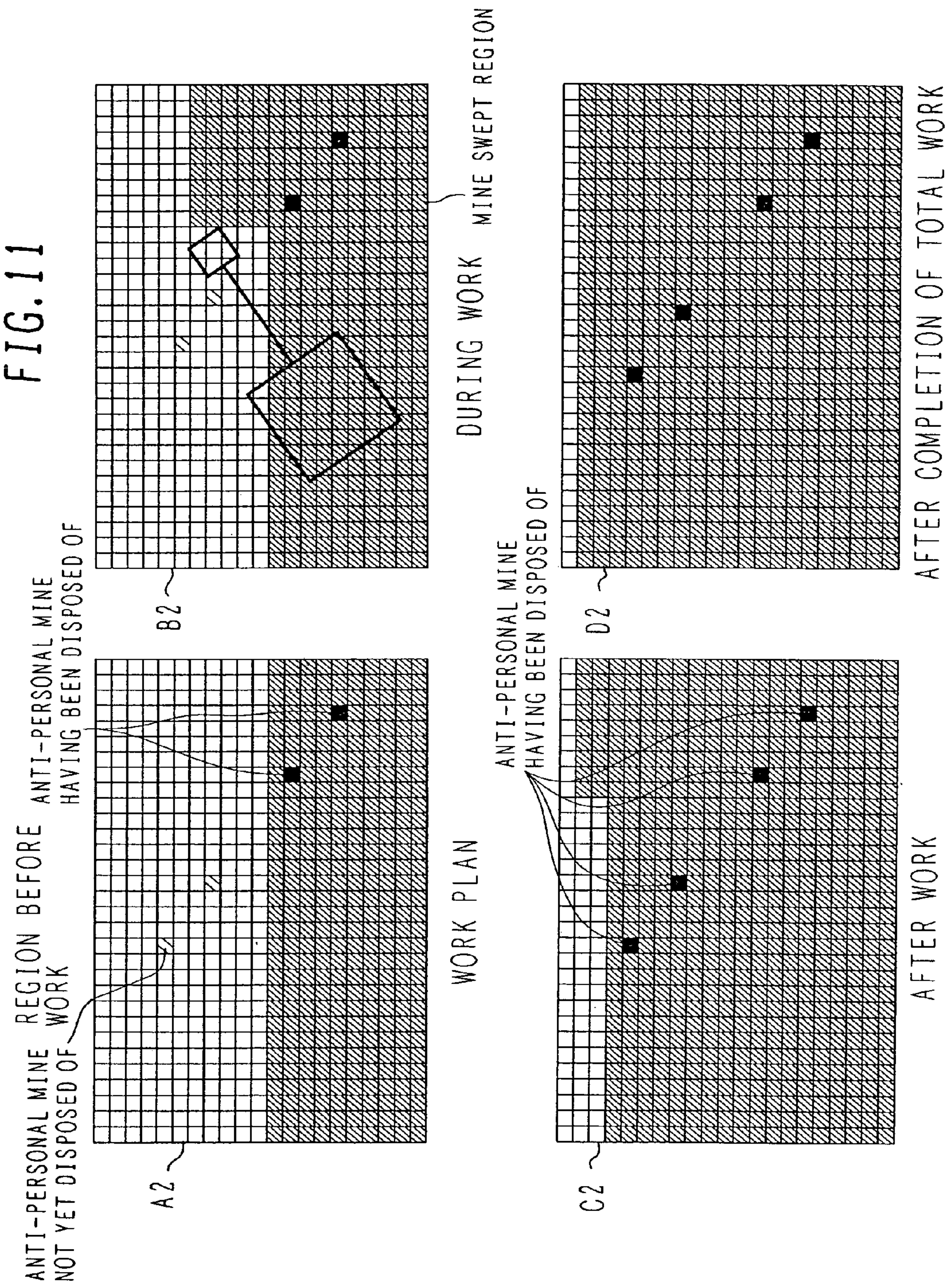
FIG. 11 shows screen examples displayed on a monitor of the computer.

FIG. 11 shows screen examples displayed on a monitor 123*a*. These screen examples are the same as those in the first embodiment shown in FIG. 5 except that the displayed state of the working region is changed from the landform (height) to the buried mine data (the presence or absence of a mine and the mine type). More specifically, an upper left example in FIG. 11 represents a work plan screen A2 used in the work planning stage, and an upper right example in FIG. 11 represents a during-work screen B2 used for supporting the operator during work. A lower left example in FIG. 11 represents an after-work screen C2 used after the end of work on one day, and a lower right example in FIG. 11 represents a total-work completion screen D2 used after the completion of total work for the planned entire working region. In each of those screens, the state of the working region is displayed in a plan view where the state is represented in units of mesh by color coding (in FIG. 11, it is represented by different densities of hatched meshes for the sake of convenience, and this is similarly applied to the following description). Further, in the during-work screen B2 at the upper right position in FIG. 11, the three-dimensional position of the mine sweeping machine 101 and the front attitude (three-dimensional position of the rotary cutter) are displayed in superimposed relation to the state during work.

Figure 12:
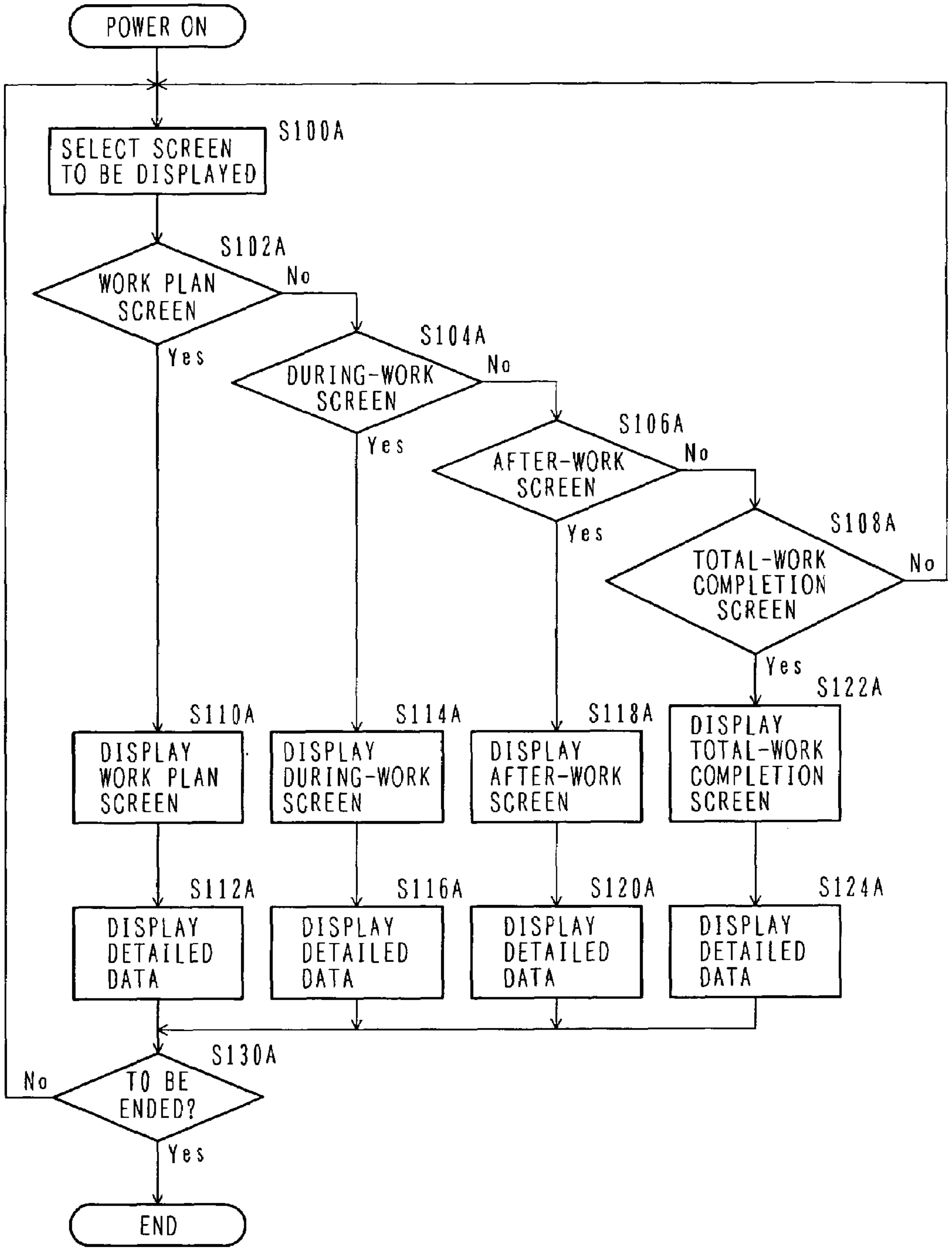
FIG. 12 is a flowchart showing processing procedures of the computer.

FIG. 12 is a flowchart showing processing procedures of the computer 123. The processing procedures of the computer 123 are also the same as those in the first embodiment shown in FIG. 7 except for the display process of "work plan screen", "during-work screen", "after-work screen" and "total-work completion screen", and the display process of detailed data.

In FIG. 12, steps corresponding to those shown in FIG. 7 are denoted by the same symbols suffixed with A.

In FIG. 12, if "work plan screen" is selected, the work plan screen A2 shown in FIG. 11 is displayed on the monitor 123*a* and detailed data in the work planning stage is also displayed (steps S102A, S110A and S112A). The detailed data displayed here includes the area of the planned working region, the total number of mines to be removed, etc. The total number of mines to be removed can be obtained from the state of the working region before the start of work. Those obtained data are stored in the work information table 143.

If "during-work screen" is selected, the during-work screen B2 shown in FIG. 11 is displayed on the monitor 123*a* and detailed data during work is also displayed (steps S104A, S114A and S116A). The detailed data displayed here includes the area of the working region currently under work, the rotation speed of the rotary cutter, etc. Those data are stored in the machine position information table 141.

If "after-work screen" is selected, the after-work screen C2 shown in FIG. 11 is displayed on the monitor 123*a* and detailed data after work is also displayed (steps S106A, S118A and S120A). The detailed data displayed here includes the area of the mine swept working region and the number of disposed-of mines on that day. The number of disposed-of mines on that day can be calculated from the difference between the state before work and the state after work on that day. Those data are stored in the work information table 143.

If "total-work completion screen" is selected, the total-work completion screen D2 shown in FIG. 11 is displayed on the monitor 123*a* and detailed data after the completion of total work is also displayed (steps S108A, S122A and S124A). The detailed data displayed here includes the total area of the completely mine swept region, the number of mines actually disposed of in the total area, etc. The total number of disposed-of mines can be calculated by summing up the daily number of disposed-of mines from the first to last day. Those data are also stored in the work information table 143.

Processing procedures of steps S110A, S114A, S118A and S122A of displaying the respective screens with selection of the work plan screen, the during-work screen, the after-work screen, and the total-work completion screen are the same as those in the first embodiment shown in the flowchart of FIG. 8. In this second embodiment, however, the buried mine data (the presence or absence of a mine and the mine type) per mesh is used to represent the state of the working region for each mesh instead of the landform height per mesh.

This second embodiment thus constituted can also provide similar advantages to those obtained with the first embodiment.

The mine sweeping support database 140 includes the display table 147 and the display specifics table 148, which serve as storage means dedicated for display. The state of the working region per mesh is stored in the display table 147, and the discriminative display method (display color) is stored in the display specifics table 148 corresponding to the state per mesh. Reference is made to the display specifics table 148 on the basis of the state (the presence or absence of a mine and the mine type) per mesh, which is stored in the display table 147, to read the corresponding display color from the display specifics table 148, thereby displaying the state of the working region in a color-coded manner. Even for different types of working machines, therefore, the state of the working region can similarly be displayed in a discriminative manner just by modifying parameters (e.g., from the height in the first embodiment to the presence or absence of a mine and the mine type), which are used to represent the state of the working region stored in the display table 147 and the display specifics table 148, depending on the type of working machine and by modifying, in match with such a modification, parameters related to the state of the working region, which are used in the processing software represented as the flowcharts of FIG. 12. As a result, it is possible to easily employ the work support and management system in different types of working machines in common, and to inexpensively prepare the work support and management system with ease.

Also, the display table 147 dedicated for display is provided separately from the work object information table 144 and the before-work object information table 145, and the processing is executed while selectively using the storage means, i.e., either the display table 147 or the others including the work object information table 144 and the before-work object information table 145, between when the state of the working region is subjected to the discriminative display process and when the work data is subjected to the arithmetic operation process. Therefore, the creation of the programs can be facilitated, and the work support and management system can more easily be prepared.

Further, the working region is represented in units of mesh indicating a plane of a predetermined size, and the state of the working region is stored per mesh in the work object information table 144, the before-work object information table 145, and the display table 147. The processing software shown in the flowchart of FIG. 12 executes the display process and the arithmetic operation process of the detailed data per mesh. Therefore, the creation of the individual programs can be facilitated, and the work support and management system can more easily be prepared.

Moreover, with this embodiment, when the work plan screen is selected, the state of the working region before the start of work is displayed in a color-coded manner, and the area of the planned working region and the total number of mines to be removed are displayed as numerical values. Therefore, the work plan can easily be prepared, thus resulting in an increase of the working efficiency and the management efficiency.

When the during-work screen is selected, the state during work is displayed in a color-coded manner, and the three-dimensional position of the mine sweeping machine and the front attitude are displayed in superimposed relation to the state during work. It is therefore possible to facilitate confirmation of the progress of work, to avoid the mine sweeping operation from being repeated in the same place, and to increase the working efficiency. In addition, a buried object is prevented from being destroyed by false, which results in an improvement of safety.

When the after-work screen is selected, the state after work on that day is displayed in a color-coded manner, and the area of the mine swept working region and the number of disposed-of mines on that day are displayed as numerical values. Therefore, logging on a daily report can be facilitated, and the management efficiency can be increased.

When the total-work completion screen is selected, the state after the completion of total work is displayed in a color-coded manner. Further, the total area of the completely mine swept region and the total number of disposed-of mines can be confirmed, thus resulting in an increase of the management efficiency.

A third embodiment of the present invention will be described with reference to FIG. 13 through 16.

Figure 13:
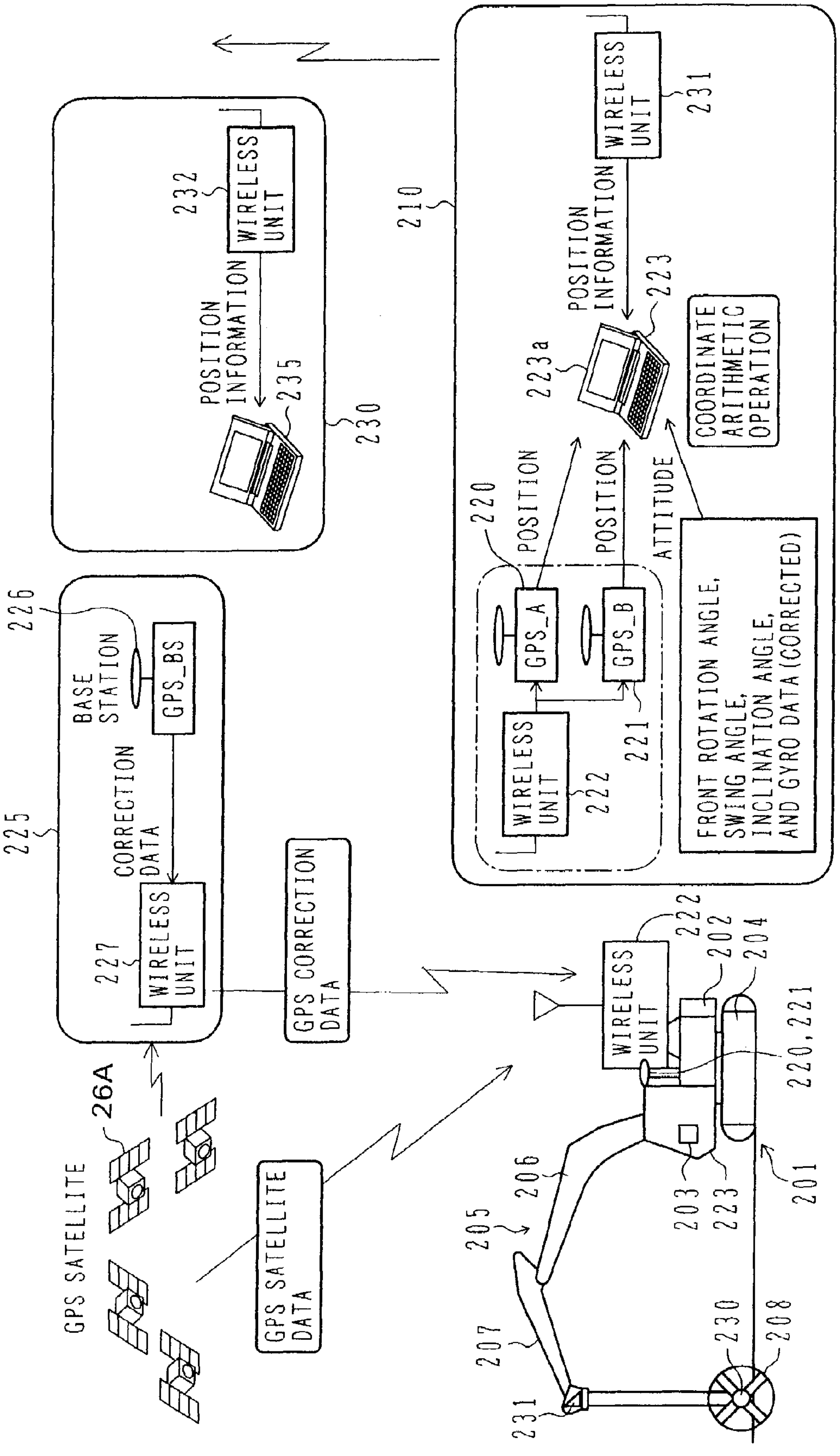
FIG. 13 is an illustration showing the overall configuration of a work support and management system according to a third embodiment in which the present invention is applied to a ground improving machine.

FIG. 13 is an illustration showing the overall configuration of a work support and management system according to the third embodiment in which the present invention is applied to a ground improving machine.

Referring to FIG. 13, a ground improving machine 201 is constructed by using a crawler mounted hydraulic excavator as a base machine, and has the same basic structure as the hydraulic excavator shown in FIG. 1. Similar components to those in FIG. 1 are denoted by respective numerals increased by 200. However, a front operating mechanism 205 includes, instead of the bucket, a stirrer 208 for spraying a solidifier into soft ground and stirring it.

An on-board system 210 is mounted on the ground improving machine 201, and a GPS base station 225 and a management room 230 are installed in other places. The GPS base station 225 and the management room 230 also have the same basic configuration as those shown in FIG. 1, and similar components to those in FIG. 1 are denoted by respective numerals increased by 200. However, the on-board system 210 additionally includes a rotation counter 230 for detecting the rotation speed of the stirrer 208 and a verticality meter 231 for measuring the verticality of the stirrer 208.

Further, a computer 223 of the on-board system 210 has the same configuration as that in the first embodiment shown in FIG. 2. In this third embodiment, however, signals from the rotation counter 230 and the vertically meter 231 are also inputted to the input device (A/D converter) 232 (see FIG. 2).

Figure 14:
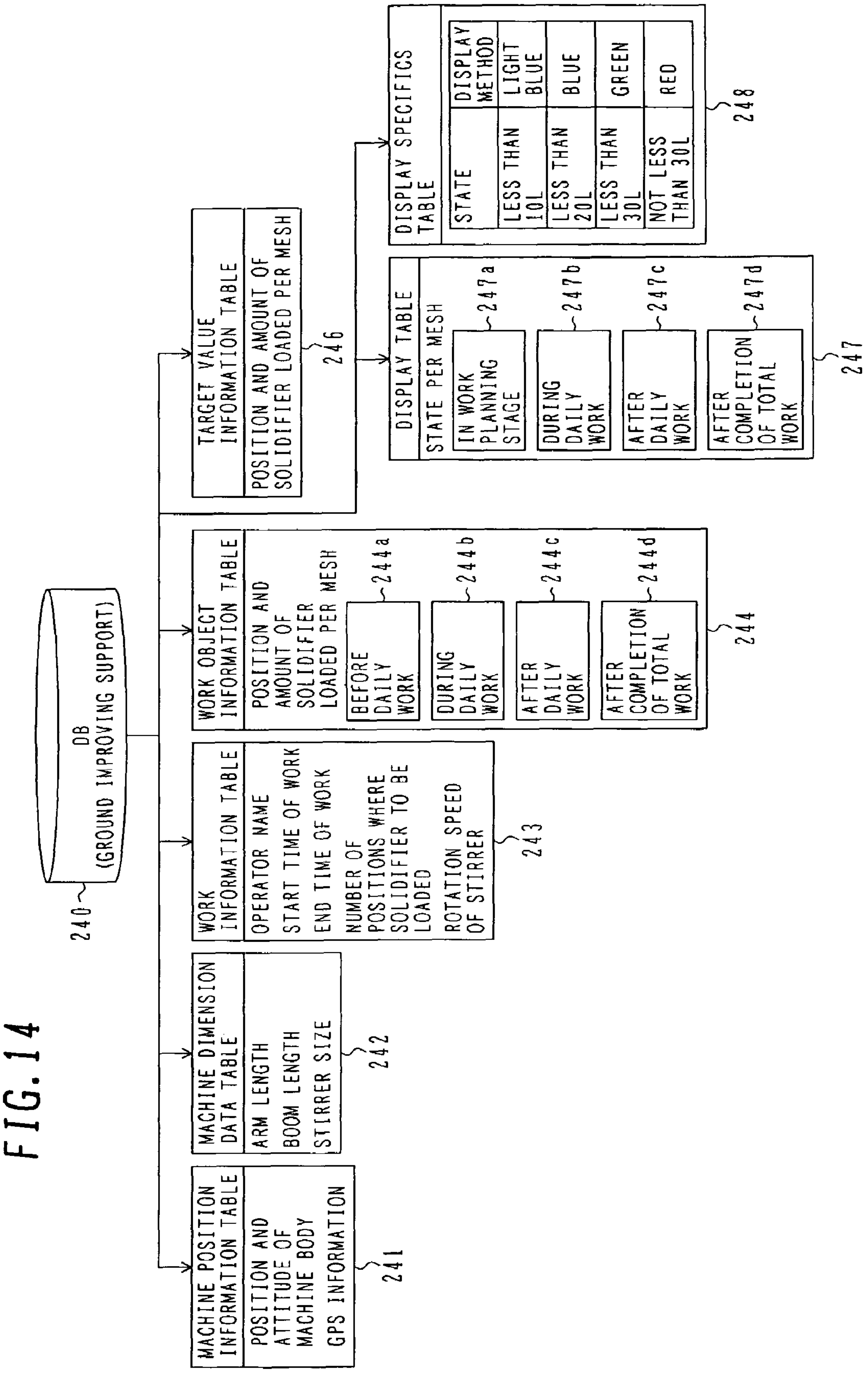
FIG. 14 is a representation showing the configuration of an excavation support database stored in a computer of an on-board system.

As shown in FIG. 14, the computer 223 of the on-board system 210 includes a ground improving support database 240. The ground improving support database 240 also has the same basic configuration as the database in the first embodiment shown in FIG. 3 except for omission of the before-work object information table, and similar tables to those in FIG. 3 are denoted by respective numerals increased by 200. More specifically, the ground improving support database 240 is made up of a machine position information table 241, a machine dimension data table 242, a work information table 243, a work object information table 244, a target value information table 246, a display table 247, and a display specifics table 248.

The data contents stored in the tables 241 through 248 are essentially the same as those in the first embodiment shown in FIG. 3 except for the following points.

The machine position information table 241 and the machine dimension data table 242 store, as attachment information, information related to the stirrer instead of the bucket. The work information table 243 stores, instead of the amount of excavated earth, the number of positions where the solidifier is to be loaded, the rotation speed of the stirrer, etc. The work object information table 244, the target value information table 246, and the display table 247 store, instead of the landform (height), the position and amount of the solidifier loaded as the state of the working region.

The following points are the same as in the first embodiment shown in FIG. 3. The current state of the working region stored in the work object information table 244 includes the state before daily work, the state during daily work, the state after daily work, and the state after the completion of total work. Those states are stored in areas 244*a*, 244*b*, 244*c* and 244*d*, which are independent of one another. The current state of the working region and the target state of the working region, which are stored respectively in the work object information table 244 and the target value information table 246, are each expressed in a way of representing the working region in units of mesh that indicates a plane of a predetermined size, and are each stored as information per mesh. The display specifics table 248 stores the relationship between the state of the working region per mesh and the discriminative display method (display color). Additionally, because the mesh indicating the predetermined size represents in itself the position information, the amount of the loaded solidifier is stored in combination with the position information of the mesh, as the state of the working region (i.e., the position and amount of the solidifier loaded), in the work object information table 244, the target value information table 246, and the display table 247.

The state of the working region stored in the display table 247 includes the state in the work planning stage, the state during work, the state after work, and the state after the completion of total work. The state in the work planning stage is given by copying the target value before the start of work, which is stored in the target value information table 246. The state during work is given by copying the state during work, which is stored in the work object information table 244. The state after work is given by copying the state after work, which is stored in the work object information table 244. The state after the completion of total work is given by copying the state after the completion of total work, which is stored in the work object information table 244. Those states are stored in corresponding areas 247*a*, 247*b*, 247*c* and 247*d* within the display table 247.

Further, the relationship between the state of the working region and the discriminative display method (display color), which is stored in the display specifics table 248, is given such that the state of the working region is stored as information indicating the amount of the loaded solidifier and the discriminative display method is provided by color coding. For example, the relationship is represented by combinations of states and colors, such as the amount of the loaded solidifier less than 10 liters and light blue, the amount of the loaded solidifier not less than 10 liters, but less than 20 liters and blue, the amount of the loaded solidifier not less than 20 liters, but less than 30 liters and green, and the amount of the loaded solidifier not less than 30 liters. The discriminative display method may also be practiced, as mentioned above, by using symbols, e.g., ⊙, ○, ●, x and Δ, instead of color coding.

The current state of the working region includes, as mentioned above, the state before daily work, the state during daily work, the state after daily work, and the state after the completion of total work. Of those states, the state during daily work can be obtained by, whenever the solidifier is loaded, correcting the previous current state. That data is periodically stored and updated in the work object information table 244 upon timer interrupts. Also, of the state before daily work, the state before work on the first day for the total working term can be obtained by copying the target value before the start of work stored in the target value information table 246. The state before work on the second or subsequent day can be obtained by copying the state after work on the previous day, and the state after daily work can be obtained by copying the last state during work on that day. Those data are also stored in the work object information table 244. Further, the state after the completion of total work can be obtained by copying the state after work at the completion of the total work, and that data is similarly stored in the work object information table 244. Of the target state of the working region, the position where the solidifier is to be loaded can be obtained from data representing a place that requires the loading of the solidifier, and the amount of the loaded solidifier can be obtained by converting the hardness of the ground requiring the loading of the solidifier into the amount of the loaded solidifier. Those data are also subjected to the mesh processing and stored in the target value information table 246.

As mentioned above, map data may be superimposed, as required, on the data stored in the tables 244 through 247. This enables the operator to know the presence or absence of rivers, roads, etc., thus resulting in an increase of the working efficiency.

Figure 15:
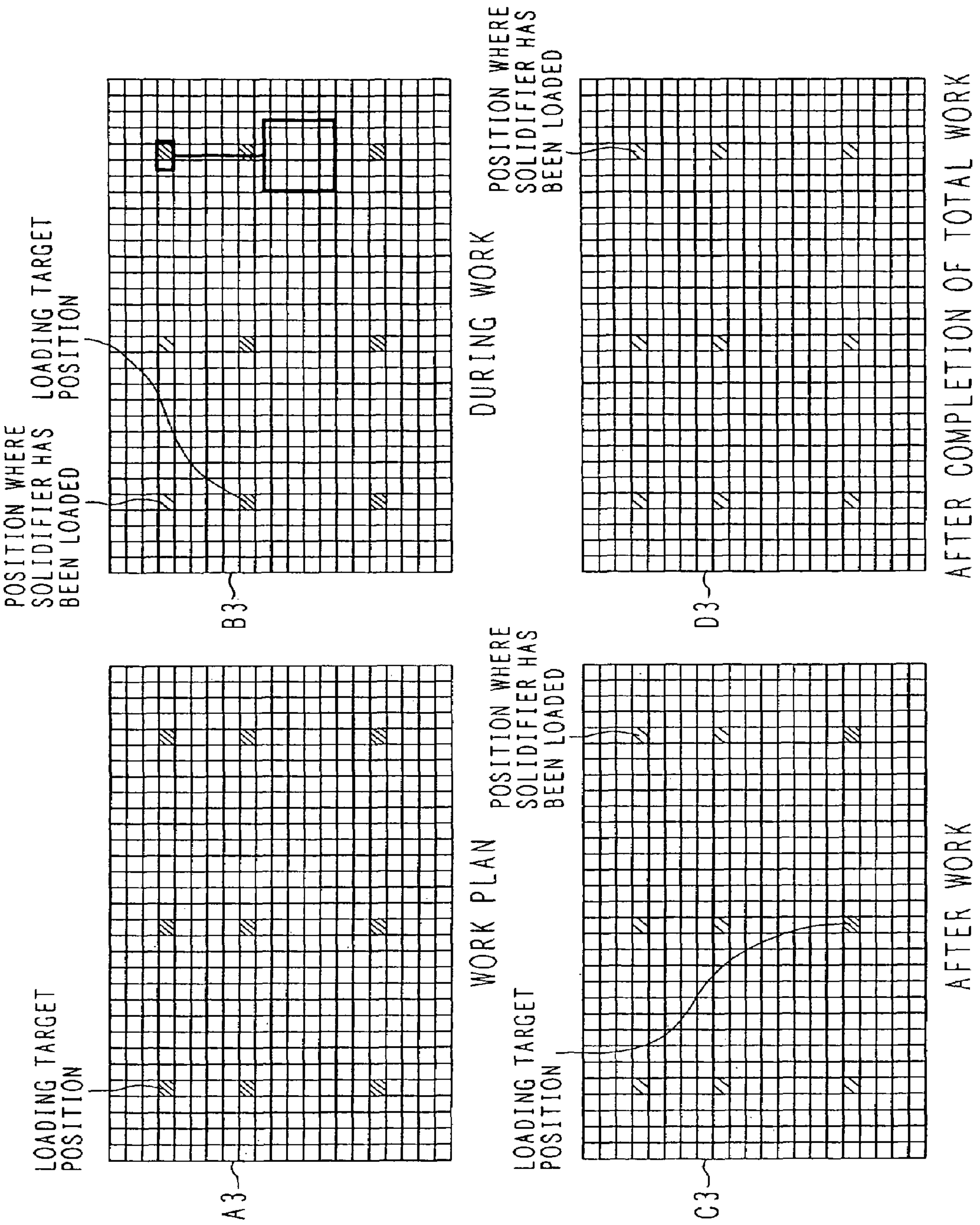
FIG. 15 shows screen examples displayed on a monitor of the computer.

FIG. 15 shows screen examples displayed on a monitor 223*a*. These screen examples are the same as those in the first embodiment shown in FIG. 5 except that the displayed state of the working region is changed from the landform (height) to the position and amount of the solidifier loaded. More specifically, an upper left example in FIG. 15 represents a work plan screen A3 used in the work planning stage, and an upper right example in FIG. 15 represents a during-work screen B3 used for supporting the operator during work. A lower left example in FIG. 15 represents an after-work screen C3 used after the end of work on one day, and a lower right example in FIG. 15 represents a total-work completion screen D3 used after the completion of total work for the planned entire working region. In each of those screens, the state of the working region is displayed in a plan view where the state is represented in units of mesh by color coding (in FIG. 15, it is represented by different densities of hatched meshes for the sake of convenience, and this is similarly applied to the following description). Further, in the during-work screen B3 at the upper right position in FIG. 15, the three-dimensional position of the ground improving machine 201 and the front attitude (three-dimensional position of the stirrer) are displayed in superimposed relation to the state during work.

Figure 16:
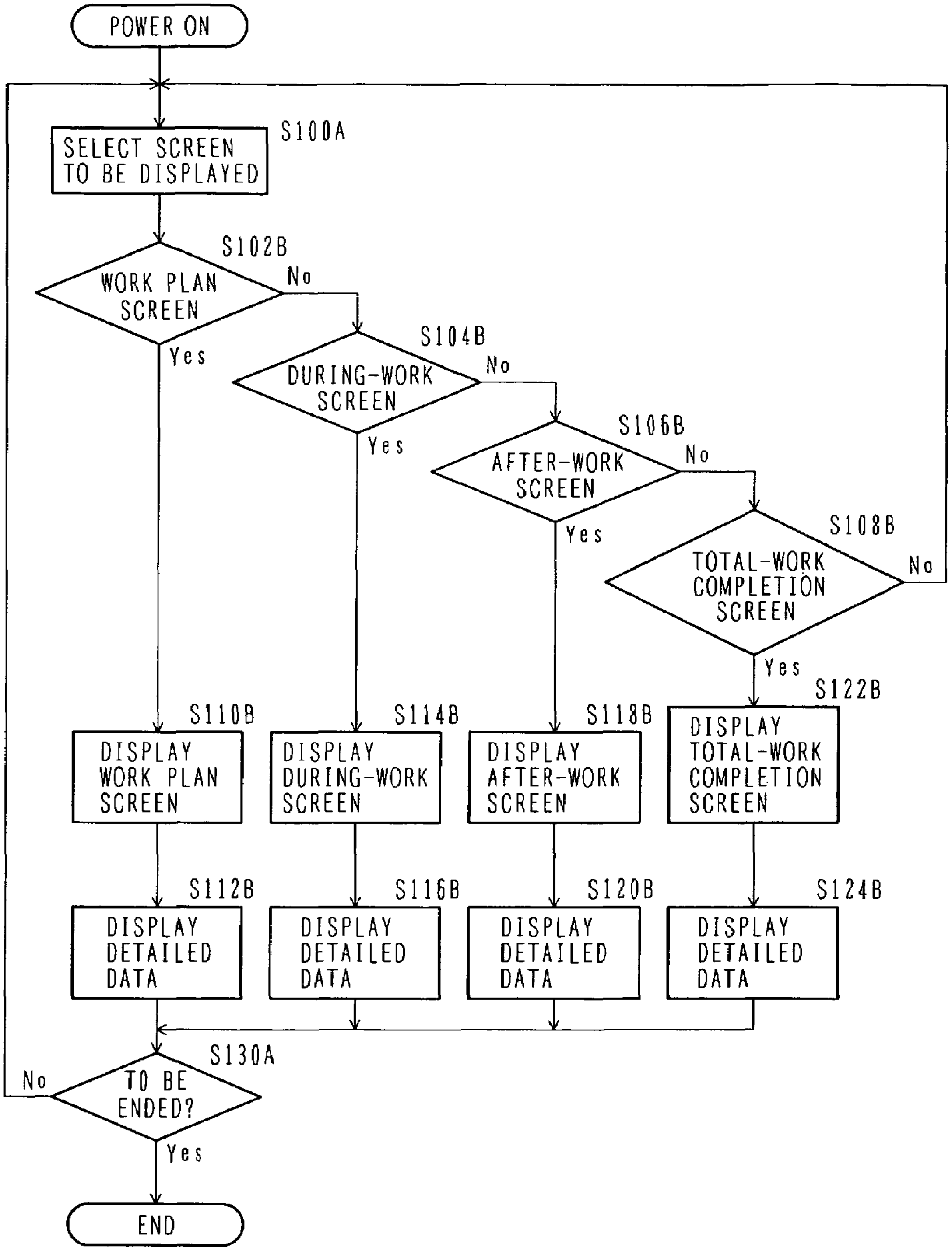
FIG. 16 is a flowchart showing processing procedures of the computer.

FIG. 16 is a flowchart showing processing procedures of the computer 223. The processing procedures of the computer 223 are also the same as those in the first embodiment shown in FIG. 7 except for the display process of "work plan screen", "during-work screen", "after-work screen" and "total-work completion screen", and the display process of detailed data. In FIG. 16, steps corresponding to those shown in FIG. 7 are denoted by the same symbols suffixed with B.

In FIG. 16, if "work plan screen" is selected, the work plan screen A3 shown in FIG. 15 is displayed on the monitor 223*a* and detailed data in the work planning stage is also displayed (steps S102B, S110B and S112B). The detailed data displayed here includes the area of the planned working region, the number of positions where the solidifier is to be loaded, the amount of the loaded solidifier, etc. The number of positions where the solidifier is to be loaded and the amount of the loaded solidifier can be obtained from the target state of the working region. Those obtained data are stored in the work information table 243.

If "during-work screen" is selected, the during-work screen B3 shown in FIG. 15 is displayed on the monitor 223*a* and detailed data during work is also displayed (steps S104B, S114B and S116B). The detailed data displayed here includes the area of the working region currently under work, the amount of the loaded solidifier, the verticality and rotation speed of the stirrer, etc. Those data are stored in the machine position information table 241.

If "after-work screen" is selected, the after-work screen C3 shown in FIG. 15 is displayed on the monitor 223*a* and detailed data after work is also displayed (steps S106B, S118B and S120B). The detailed data displayed here includes the area of the solidifier loaded working region, the number of positions where the solidifier has been loaded, and the amount of the loaded solidifier on that day. The number of positions where the solidifier has been loaded and the amount of the loaded solidifier on that day can be calculated from the difference between the state before work and the state after work on that day. Those data are stored in the work information table 243.

If "total-work completion screen" is selected, the total-work completion screen D3 shown in FIG. 15 is displayed on the monitor 223*a* and detailed data after the completion of total work is also displayed (steps S108B, S122B and S124B). The detailed data displayed here includes the total area of the completely solidifier loaded region, the number of positions where the solidifier has actually been loaded, the amount of the loaded solidifier, etc. The number of positions where the solidifier has actually been loaded and the amount of the loaded solidifier can be calculated by summing up, respectively, the daily number of positions where the solidifier has been loaded and the daily amount of the loaded solidifier from the first to last day. Those data are also stored in the work information table 243.

Processing procedures of steps S110B, S114B, S118B and S122B of displaying the respective screens with selection of the work plan screen, the during-work screen, the after-work screen, and the total-work completion screen are the same as those in the first embodiment shown in the flowchart of FIG. 8. In this third embodiment, however, the amount of the loaded solidifier per mesh is used to represent the state of the working region for each mesh instead of the landform height per mesh.

This third embodiment thus constituted can also provide similar advantages to those obtained with the first embodiment.

The ground improving support database 240 includes the display table 247 and the display specifics table 248, which serve as storage means dedicated for display. The state of the working region per mesh is stored in the display table 247, and the discriminative display method (display color) is stored in the display specifics table 248 corresponding to the state per mesh. Reference is made to the display specifics table 248 the basis of the state (the position and amount of the solidifier loaded) per mesh, which is stored in the display table 247, to read the corresponding display color from the display specifics table 248, thereby displaying the state of the working region in a color-coded manner. Even for different types of working machines, therefore, the state of the working region can similarly be displayed in a discriminative manner just by modifying parameters (e.g., from the height in the first embodiment to the position and amount of the solidifier loaded), which are used to represent the state of the working region stored in the display table 247 and the display specifics table 248, depending on the type of working machine and by modifying, in match with such a modification, parameters related to the state of the working region, which are used in the processing software represented as the flowcharts of FIG. 16. As a result, it is possible to easily employ the work support and management system in different types of working machines in common, and to inexpensively prepare the work support and management system with ease.

Also, the display table 247 dedicated for display is provided separately from the work object information table 244 and the target value information table 246, and the processing is executed while selectively using the storage means, i.e., either the display table 247 or the others including the work object information table 244 and the target value information table 246, between when the state of the working region is subjected to the discriminative display process and when the work data is subjected to the arithmetic operation process. Therefore, the creation of the programs can be facilitated, and the work support and management system can more easily be prepared.

Further, the working region is represented in units of mesh indicating a plane of a predetermined size, and the state of the working region is stored per mesh in the work object information table 244, the target value information table 246, and the display table 247. The processing software shown in the flowchart of FIG. 16 executes the display process and the arithmetic operation process of the detailed data per mesh. Therefore, the creation of the individual programs can be facilitated, and the work support and management system can more easily be prepared.

Moreover, with this embodiment, when the work plan screen is selected, the state of the working region before the start of work is displayed in a color-coded manner together with the target positions of solidifier loading, and the area of the planned working region, the number of positions where the solidifier is to be loaded and the amount of the loaded solidifier are displayed as numerical values. Therefore, whether the work plan is proper or not can be determined in advance, thus resulting in an increase of the efficiency of work planning. Also, the amount of the loaded solidifier, which is required for the work, can be estimated, thus resulting in an increase of the working efficiency.

When the during-work screen is selected, the state during work is displayed in a color-coded manner, and the three-dimensional position of the ground improving machine and the front attitude are displayed in superimposed relation to the state during work. It is therefore possible to facilitate confirmation of the progress of work, to enable the next work position to be promptly confirmed and easily located, and to increase the working efficiency. In addition, the number of workers required for locating the next position can be reduced, and hence the cost can be cut correspondingly.

When the after-work screen is selected, the state after work on that day is displayed in a color-coded manner, and the area of the solidifier loaded working region, the number of positions where the solidifier has been loaded, the amount of the loaded solidifier, etc. are displayed as numerical values. Therefore, logging on a daily report can be facilitated, and the management efficiency can be increased.

When the total-work completion screen is selected, the state after the completion of total work is displayed in a color-coded manner. Further, the total area of the completely solidifier loaded region, the number of positions where the solidifier has actually been loaded, and the amount of the loaded solidifier can be confirmed, thus resulting in an increase of the management efficiency.

In the embodiments described above, the display table dedicated for display is prepared in the work support database, and the state of the working region used for display is stored in the display table. Depending on cases, however, the state of the working region used for display may be stored in the work object information table, the before-work object information table, and/or the target value information table, or it may given in common as the data stored in each of those tables, while the display table is omitted.

INDUSTRIAL APPLICABILITY

According to the present invention, even for different types of working machines, the state of the working region can similarly be displayed in a discriminative manner just by modifying parameters related to the state of the working region, which are used in first processing means, in match with a modification of parameters used to represent the state of the working region stored in first and second storage means. It is therefore possible to easily employ the work support and management system in different types of working machines in common, and to inexpensively prepare the work support and management system with ease.

The invention claimed is:

1. A work support and management system for a working machine, which supports and manages work carried out by a working machine, said system comprising:

first storage means used for arithmetic operations and storing the state of a working region where said working machine carries out work;

second storage means dedicated for display only and storing the state of said working region for display prepared by using the state of the working region stored in said first storage means;

third storage means for storing the relationship between the state of said working region stored in said second storage means and a discriminative display method;

display means for displaying the state of said working region, wherein said display means includes first processing means for obtaining discriminative display data by referring to the relationship stored in said third storage means on the basis of the state of said working region stored in said second storage means, and for displaying the state of said working region in a discriminative manner, and second processing means for obtaining work data based on data stored in said first storage means and displaying the obtained work data;

wherein said working region is represented in units of mesh indicating a plane of a predetermined size, and said second storage means stores the state of said working region per mesh;

wherein said first processing means obtains the discriminative display data by referring to the relationship stored in said third storage means on the basis of the state of said working region stored in said second storage means per mesh, and displays the state of said working region per mesh in a discriminative manner;

wherein said second storage means stores the discriminative display method in color-coded representation; and wherein said first processing means displays the state of said working region in a color-coded manner.

2. A work support and management system for a working machine, which measures and displays the three-dimensional position and state of a working machine, thereby supporting and managing work carried out by said working machine, said system comprising:

first storage means used for display and storing, as the state of said working region where said working machine carries out the work, at least one of the current state of said working region, the state of said working region before the start of the work, and a target value of the work;

second storage means for storing the relationship between the state of said working region and a discriminative display method;

third storage means for storing the three-dimensional position and state of said working machine;

fourth storage means for storing the current state of said working machine;

fifth storage means for storing at least one of the state of said working region before the start of the work and the target value of the work;

sixth storage means for storing work data of said working machine; and display means for displaying the state of said working region, wherein said display means includes selection means for selectively displaying a plurality of screens corresponding to working processes, first processing means for, when any of said plurality of screens is selected, obtaining discriminative display data by referring to the relationship stored in said second storage means on the basis of the state of said working region stored in said first storage means, and displaying the state of said working region in a discriminative manner, and second processing means for, when any of said plurality of screens is selected, obtaining the work data of the working region based on data stored in related one or more of said first, third, fourth and fifth storage means, displaying the obtained work data, and storing the obtained work data in said sixth storage means, and wherein said working region is represented in units of mesh indicating a plane of a predetermined size, and said first, fourth and fifth storage means stores the state of said working region per mesh; and wherein said first processing means obtains the discriminative display data by referring to the relationship stored in said second storage means on the basis of the state of said working region stored in said first storage means per mesh, thereby displaying the state of said working region per mesh in a discriminative manner, and said second processing means obtains the work data per mesh based on the data stored in related one or more of said first, third, fourth and fifth storage means, thereby displaying the obtained work data.

3. The work support and management system for a working machine according to claim 2, wherein said plurality of screens selectively displayed by said selection means includes a work plan screen; and wherein when said selection means selectively displays the work plan screen, said first processing means obtains the discriminative display data by referring to the relationship stored in said second storage means on the basis of, among the data stored in said first storage means, data regarding at least one of the state of said working region before the start of the work and the target value of the work, thereby displaying at least one of the state before the start of the work and the target value of the work in a discriminative manner, and said second processing means computes and displays a target work amount based on the data stored in said fifth storage means, and stores the target work amount in said sixth storage means.

4. The work support and management system for a working machine according to claim 2, wherein said plurality of screens selectively displayed by said selection means includes a during-work screen; and wherein when said selection means selectively displays the during-work screen, said first processing means obtains the discriminative display data by referring to the relationship stored in said second storage means on the basis of, among the data stored in said first storage means, data regarding the current state of said working region, thereby displaying the current state of said working region in a discriminative manner, while displaying the position and state of said working machine in superimposed relation to the state of said working region based on the data stored in said third storage means, and said second processing means computes and displays the data regarding the position and state of said working machine based on the data stored in said third storage means.

5. The work support and management system for a working machine according to claim 2, wherein said plurality of screens selectively displayed by said selection means includes an after-work screen; and wherein when said selection means selectively displays the after-work screen, said first processing means obtains the discriminative display data by referring to the relationship stored in said second storage means on the basis of the data stored in said first storage means, thereby displaying the state of said working region after the work in a discriminative manner, and said second processing means computes and displays an amount of the work made on that day based on, among the data stored in said fourth storage means, the data regarding the current state of said working region, and stores the amount of the work made on that day in said sixth storage means.

6. The work support and management system for a working machine according to claim 2, wherein said plurality of screens selectively displayed by said selection means includes a total-work completion screen; and wherein when said selection means selectively displays the total-work completion screen, said first processing means obtains the discriminative display data by referring to the relationship stored in said second storage means on the basis of, among the data stored in said first storage means, data regarding the current state of said working region, thereby displaying the state of said working region after the completion of total work, and said second processing means computes and displays a total amount of completed work based on the data stored in said fourth storage and the data stored in said fifth storage, and stores the quality management information in said sixth storage.

7. The work support and management system for a working machine according to claim 2, wherein said second storage means stores the discriminative display method in color-coded representation; and wherein said first processing means displays the state of said working region in a color-coded manner.

8. The work support and management system for a working machine according to claim 1, wherein said working machine is a hydraulic excavator, and the state of said working region is represented by a landform of said working region.

9. The work support and management system for a working machine according to claim 1, wherein said working machine is a mine sweeping machine, and the state of said working region is represented by the presence or absence of mines buried in said working region and the mine type.

10. The work support and management system for a working machine according to claim 1, wherein said working machine is a ground improving machine, and the state of said working region is represented by positions where a solidifier is loaded and an amount of the loaded solidifier.

11. A work support and management system for a working machine, which supports and manages work carried out by a working machine, said system comprising:

first storage means used for arithmetic operations and storing the state of a working region where said working machine carries out work, including the state during work obtained based on sensor values of the working machine;

second storage means dedicated for display only and storing the state of said working region for display prepared by using the state of the working region stored in said first storage means;

third storage means for storing the relationship between the state of said working region stored in said second storage means and a discriminative display method; and display means for displaying the state of said working region at least in a during-work screen, wherein said display means includes first processing means for obtaining discriminative display data by referring to the relationship stored in said third storage means on the basis of the state of said working region stored as display data in said second storage means, and for displaying the state of said working region in a discriminative manner, and second processing means for obtaining work amount data based on data stored in said first storage means and displaying the obtained work amount data;

wherein said display means displays said working region in said during-work screen in units of mesh indicating a plane of a predetermined size;

wherein said second storage means stores the state of said working region per mesh; and wherein said first processing means obtains the discriminative display data by referring to the relationship stored in said third storage means on the basis of the state of said working region stored in said second storage means per mesh, and displays the state of said working region per mesh in a discriminative manner.

12. The work support and management system for a working machine according to claim 11, wherein said system further comprises fourth storage means for storing work amount data of said working machine;

wherein said display means further includes selection means for selectively displaying a plurality of screens corresponding to working processes and including said during-work screen;

wherein said first processing means obtains the discriminative display data by referring to the relationship stored in said third storage means on the basis of the state of said working region for display stored in said second storage means and displays the state of said working region in a discriminative manner when any of said plurality of screens is selected; and wherein said second processing means obtains the work amount data of the working region based on data stored in said first storage means, displays the obtained work amount data, and stores the obtained work amount data in said fourth storage means when any of said plurality of screens is selected.

13. The work support management system for a working machine according to claim 12, wherein said plurality of screens selectively displayed by said selection means includes a work plan screen; and wherein when said selection means selectively displays the work plan screen, said first processing means obtains the discriminative display data by referring to the relationship stored in said third storage means on the basis of, among the data stored in said second storage means, data regarding at least one of the state of said working region before the start of the work and the target value of the work, thereby displaying at least one of the state before the start of the work and the target value of the work in a discriminative manner, and said second processing means computes and displays a target work amount based on the data stored in said first storage means, and stores the target work amount in said fourth storage means.

14. The work support and management system for a working machine according to claim 12, wherein said plurality of screens selectively displayed by said selection means includes said during-work screen; and wherein when said selection means selectively displays the during-work screen, said first processing means obtains the discriminative display data by referring to the relationship stored in said third storage means on the basis of, among the data stored in said second storage means, data regarding the current state of said working region, thereby displaying the current state of said working region in a discriminative manner, while displaying the position and state of said working machine in superimposed relation to the state of said working region based on sensor values of the working machine, and said second processing means computes and displays the data regarding the position and state of said working machine based on the sensor values of the working machine.

15. The work support and management system for a working machine according to claim 12, wherein said plurality of screens selectively displayed by said selection means includes an after-work screen; and wherein when said selection means selectively displays the after-work screen, said first processing means obtains the discriminative display data be referring to the relationship stored in said third storage means on the basis of the data stored in said second storage means, thereby displaying the state of said working region after the work in a discriminative manner, and said second processing means computes and displays an amount of the work made on that day based on, among the data stored in said first storage means, the data regarding the current state of said working region, and stores the amount of the work made on that day in said fourth storage means.

16. The work support and management system for a working machine according to claim 12, wherein said plurality of screens selectively displayed by said selection means includes a total-work completion screen; and wherein when said selection means selectively displays the after-work screen, said first processing means obtains the discriminative display data by referring to the relationship stored in said third storage means on the basis of, among the data stored in said second storage means, data regarding the current state of said working region, thereby displaying the state of said working region after the completion of total work, and said second processing means computes and displays a total amount of completed work based on the data stored in said first storage means, and stores the quality management information in said fourth storage means.

17. The work support and management system for a working machine according to claim 11, wherein said third storage means stores the discriminative display method in color-coded representation; and wherein said first processing means displays the state of said working region in a color-coded manner.

18. The work support and management system for a working machine according to claim 11, wherein said working machine is a hydraulic excavator, and the state of said working region is represented by a landform of said working region.

19. The work support and management system for a working machine according to claim 11, wherein said working machine is a mine sweeping machine, and the state of said working region is represented by the presence or absence of mines buried in said working region and the mine type.

20. The work support and management system for a working machine according to claim 11, wherein said working machine is a ground improving machine, and the state of said working region is represented by positions where a solidifier is loaded and an amount of the loaded solidifier.

* * * * *